United States Patent
Wolke et al.

(10) Patent No.: US 12,223,665 B2
(45) Date of Patent: Feb. 11, 2025

(54) MARKERLESS REGISTRATION OF IMAGE AND LASER SCAN DATA

(71) Applicant: FARO Technologies, Inc., Lake Mary, FL (US)

(72) Inventors: Matthias Wolke, Korntal-Münchingen (DE); Jafar Amiri Parian, Schlieren (CH)

(73) Assignee: FARO TECHNOLOGIES, INC., Lake Mary, FL (US)

(*) Notice: Subject to any disclaimer, the term of this patent is extended or adjusted under 35 U.S.C. 154(b) by 386 days.

(21) Appl. No.: 17/884,641

(22) Filed: Aug. 10, 2022

(65) Prior Publication Data

US 2023/0154020 A1 May 18, 2023

Related U.S. Application Data

(60) Provisional application No. 63/279,410, filed on Nov. 15, 2021.

(51) Int. Cl.
- G06T 7/33 (2017.01)
- G06T 7/73 (2017.01)
- H04N 23/698 (2023.01)

(52) U.S. Cl.
CPC ............... G06T 7/337 (2017.01); G06T 7/74 (2017.01); *G06T 2207/10024* (2013.01); *G06T 2207/10028* (2013.01); *G06T 2207/10032* (2013.01); *H04N 23/698* (2023.01)

(58) Field of Classification Search
CPC . G06T 7/337; G06T 7/74; G06T 2207/10024; G06T 2207/10028; G06T 2207/10032; H04N 23/698

USPC ........................................................ 382/103
See application file for complete search history.

(56) References Cited

U.S. PATENT DOCUMENTS

| | | | |
|---|---|---|---|
| 8,705,012 B2 | 4/2014 | Greiner et al. | |
| 10,824,773 B2 | 11/2020 | Santos et al. | |
| 10,989,532 B2 | 4/2021 | Buback et al. | |
| 2008/0075326 A1* | 3/2008 | Otani | G01S 17/86 382/106 |
| 2012/0148162 A1* | 6/2012 | Zhang | G06T 7/11 382/195 |

(Continued)

OTHER PUBLICATIONS

European Office Action for Application No. 22207351.2, dated Apr. 11, 2023, 7 pages.

*Primary Examiner* — Allen H Nguyen
(74) *Attorney, Agent, or Firm* — McCarter & English, LLP; Dave S. Christensen

(57) ABSTRACT

A system includes a first type of measurement device that captures first 2D images, a second type of measurement device that captures 3D scans. A 3D scan includes a point cloud and a second 2D image. The system also includes processors that register the first 2D images. The method includes accessing the 3D scan that records at least a portion of the surrounding environment that is also captured by a first 2D image. Further, 2D features in the second 2D image are detected, and 3D coordinates from the point cloud are associated to the 2D features. 2D features are also detected in the first 2D image, and matching 2D features from the first 2D image and the second 2D image are identified. A position and orientation of the first 2D image is calculated in a coordinate system of the 3D scan using the matching 2D features.

20 Claims, 17 Drawing Sheets

(56) References Cited

U.S. PATENT DOCUMENTS

| | | | |
|---|---|---|---|
| 2014/0300886 A1* | 10/2014 | Zogg | G01S 7/4817 |
| | | | 356/4.01 |
| 2016/0314593 A1 | 10/2016 | Metzler et al. | |
| 2017/0091923 A1* | 3/2017 | Siercks | H04N 23/51 |
| 2019/0094346 A1 | 3/2019 | Dumoulin et al. | |
| 2020/0029229 A1 | 9/2020 | Atala et al. | |
| 2020/0292297 A1 | 9/2020 | Atala et al. | |
| 2021/0209856 A1 | 7/2021 | Liukkonen et al. | |

* cited by examiner

MARKERLESS REGISTRATION OF IMAGE AND LASER SCAN DATA

CROSS REFERENCE TO RELATED APPLICATIONS

This application claims the benefit of U.S. Provisional Application Ser. No. 63/279,410, filed Nov. 15, 2021, the entire disclosure of which is incorporated herein by reference.

BACKGROUND

The subject matter disclosed herein relates to the use of measurement devices, such as laser scanners, and performing marker-less registration of image data and laser scan data.

Various applications such as facility management, forensic/crime scene investigation, accident reconstruction, architectural/civil engineering, and heritage documentation/restoration use various types of measurement devices such as two-dimensional (2D) and three-dimensional (3D) laser scanners. For example, volume scanners are used to capture measurements of entire environments, such as crime scenes, building facades, or complex piping and wiring, and various other such cumbersome tasks. Measurement devices provide an economical way of capturing and analyzing millions (or more) of 3D data points in the environment to facilitate generating detailed 2D and/or 3D images of complex environments and geometries. In addition, measurement devices such as 3D images facilitate performing inspections and verifying assemblies of products in an industrial setting accurately and at a relatively lesser cost. Measurement devices also include laser trackers that perform precise coordinate measuring that can facilitate industrial operations such as alignment, installation, part inspection, and other types of manufacturing and assembly integration projects.

While existing measurement devices are suitable for their intended purposes, what is needed is a system having certain features of aspects of the present disclosure.

BRIEF DESCRIPTION

Aspects of the technical solutions described herein can include devices, apparatus, computer program products, and any other implementation of a machine, process, or a combination thereof.

A system includes a first type of measurement device that captures first 2D images, a second type of measurement device that captures 3D scans. A 3D scan includes a point cloud and a second 2D image. The system also includes processors that register the first 2D images. The method includes accessing the 3D scan that records at least a portion of the surrounding environment that is also captured by a first 2D image. Further, 2D features in the second 2D image are detected, and 3D coordinates from the point cloud are associated to the 2D features. 2D features are also detected in the first 2D image, and matching 2D features from the first 2D image and the second 2D image are identified. A position and orientation of the first 2D image is calculated in a coordinate system of the 3D scan using the matching 2D features.

In one or more aspects, a computer-implemented method performed by one or more processors to automatically register one or more first 2D images of a surrounding environment. The computer-implemented method includes accessing a 3D scan that records at least a portion of the surrounding environment, the portion is also captured by a first 2D image from the one or more first 2D images, and the 3D scan comprises a point cloud and a second 2D image. The method also includes detecting 2D features in the second 2D image from the 3D scan, and associating 3D coordinates from the point cloud to the 2D features in the second 2D image. The method also includes detecting 2D features in the first 2D image from the first type of measurement device. The method also includes identifying matching 2D features from the first 2D image and the second 2D image from the 3D scan. The method also includes, based on determining at least a predetermined number of matching 2D features from the first 2D image and the second 2D image, calculating a position and orientation of the first 2D image in a coordinate system of the 3D scan using the matching 2D features.

In one or more aspects, the second type of measurement device is a 3D scanner and wherein the second 2D image is either captured by a camera associated with the 3D scanner, or is generated using the point cloud.

In one or more aspects, the first type of measurement device is a camera.

In one or more aspects, the 2D image from the first type of measurement device captures at least a portion of the surrounding environment that cannot be accessed by the second type of measurement device.

In one or more aspects, the first type of measurement device is a portable device that includes a camera.

In one or more aspects, the first type of measurement device is a drone.

In one or more aspects, the second 2D image in the 3D scan is a panoramic image.

In one or more aspects, the second 2D image in the 3D scan is a color image.

In one or more aspects, the 2D features comprise one or more natural features that are detected in said portion.

In one or more aspects, the one or more first 2D images and the 3D scan are captured concurrently.

In one or more aspects, the one or more first 2D images and the 3D scan are captured at different times.

According to one or more aspects, a system includes a first type of measurement device that captures first 2D images of a surrounding environment. The system also includes a second type of measurement device that captures at least a first 3D scan and a second 3D scan of the surrounding environment, the first 3D scan captured from a first position and the second 3D scan captured from a second position. The system also includes one or more processors configured to perform a computer-implemented method to register the first 3D scan and the second 3D scan, each 3D scan comprises a point cloud and a second 2D image. The computer-implemented method includes accessing one or more first 2D images from the first type of measurement device, the one or more first 2D images record portions of the surrounding environment overlapping with the first 3D scan and the second 3D scan. The computer-implemented method includes generating one or more first localized images by calculating a first pose of the one or more first 2D images with respect to the first 3D scan. The computer-implemented method includes generating one or more second localized images by calculating a second pose of the one or more first 2D images with respect to the second 3D scan. The computer-implemented method includes computing a transformation between the first 3D scan and the second 3D scan based on the first pose and the second pose.

In one or more aspects, the second 2D image is either captured by a camera or is generated using the point cloud.

In one or more aspects, generating the one or more first localized images includes detecting 2D features in the second 2D image from the first 3D scan, and associating 3D coordinates from the point cloud to the 2D features in the second 2D image. Further, 2D features in the one or more first 2D images are detected. Further, matching 2D features are identified from the one or more first 2D images and the second 2D image from the first 3D scan. Further, based on determining at least a predetermined number of matching 2D features from the one or more first 2D images and the second 2D image from the first 3D scan, the first pose of the one or more first 2D images is calculated in a coordinate system of the first 3D scan using the matching 2D features. Further, the one or more first localized images is generated by transforming the one or more first 2D images using the first pose.

In one or more aspects, the first type of measurement device is a camera, and the second type of measurement device is a 3D scanner.

Some aspects of the technical solutions assist in registering images to a terrestrial laser scan. In some aspects, the technical solutions facilitate registering one or more laser scans to one or more images. A series of images for photogrammetric processing are captured. Also, one or more laser scans with corresponding panoramic images are captured using the terrestrial laser scanner. An overlap in image content of at least one of the photogrammetry images with the panoramic image of the laser scan is determined. Aspects herein include identifying 2D features in all images. Further, the 3D coordinates of the laser scan are associated with the 2D features in the panoramic image of the laser scan. The 2D feature descriptors are matched between at least one image and one panoramic image. Further, the position and orientation (i.e., pose) of the image are calculated in the coordinate system of the laser scan with the help of the matched features and at least four associated 3D coordinates.

Some aspects of the technical solutions assist laser scan registration when there is insufficient data overlap. A series of images for photogrammetric processing are captured. Two or more laser scans with corresponding panoramic images are captured. There is an overlap in the image content of at least one of the photogrammetry images with the panoramic image of the first laser scan. Also, there is an overlap in the image content of at least one of the photogrammetry images with the panoramic image of the second laser scan. Aspects described herein facilitate identifying 2D features in all images. Further, the 3D coordinates of the laser scan are associated with the 2D features in the corresponding panoramic image of the laser scan. 2D feature descriptors are matched between at least one image and the panoramic image of the first laser scan. Also, 2D feature descriptors are matched between at least one image and the panoramic image of the second laser scan. Further, the position and orientation (i.e., pose) of the second laser scan can be computed in the coordinate system of the first laser scan based at least in parts on the position of an image position in the first laser scan and an image position in the second laser scan.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

Figure 1:
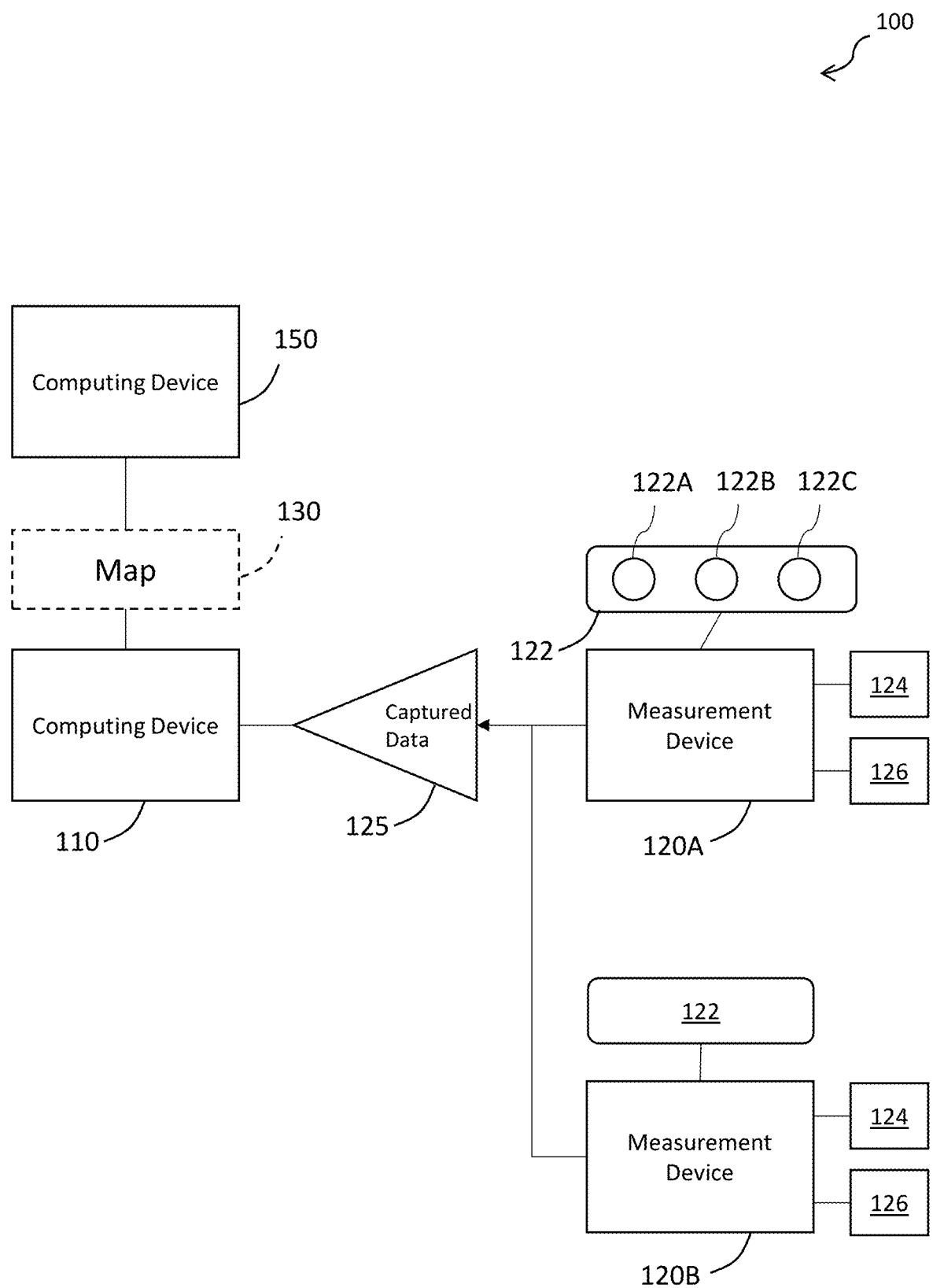
FIG. 1 depicts a system for capturing measurements in an environment according to one or more aspects.

The detailed description explains aspects of the invention, together with advantages and features, by way of example with reference to the drawings.

DETAILED DESCRIPTION

Aspects herein relate to markerless (i.e., data without target or marker-based information) registration of image data and laser scan data. Multi-sensor recordings (2D and/or 3D recordings) of scenery are commonly used to record data of a surrounding environment. Different sensor types are used to record specific parts of the object/scenery, and the advantages of the different technologies help to get a complete recording with less effort compared to a recording with a single sensor type. Here, a "sensor type" can be considered to be a type of measurement device. For example, data may be captured by a laser scanner, a laser tracker, FARO® FREESTYLE®, FARO® SCANPLAN®, articulated arm, or any other type of measurement device.

Consider an example of multi-sensor recording where a complete 3D recording of a building is captured. A laser scanner, which is positioned in a terrestrial manner, may be suited to record the majority of the interior and the facades (i.e., facades with a clear line of sight to a terrestrial position of the laser scanner and with a moderate height with respect to this position). The recording of the roof or occluded façade elements can be very challenging and, therefore, costly if performed with the terrestrial laser scanner.

An alternative and cost-efficient solution can be the use of photogrammetry, for example, using a portable camera, such as drone-based image capture. The drone can be a terrestrial drone (e.g., automatic/semi-automatic transportable robot, movable cart, etc.), an aerial drone, or any other controllable portable device. For example, multiple images are taken from above the object/scenery and can be processed into a digital 3D representation (e.g., a 3D point cloud, a mesh) in a postprocessing step.

The combination of multiple data sources is known as "registration." There exist several methods for the general registration of 3D point clouds (e.g., iterative closest point (ICP) algorithm). But most algorithms require some form of coarse pre-alignment of the point clouds. This is done by identifying common points in the participating point clouds. This can be done manually, algorithmically, or with the help of artificial intelligence. However, when different types of measurement devices are used (e.g., terrestrial laser scanner for point clouds of façade and drone-based camera for images of the roof), there are technical challenges as the sensors have a different scale, different point distribution, insufficient overlap in 3D, etc. Existing solutions to such technical challenges include physically placing markers or targets in the scenery and using representations of such markers to register data captured by different types of sensors. The markers or targets may be spherical artifacts, checkerboard artifacts, or reflective labels for example. However, physically placing the markers can be a challenge and limits such technical solutions from being used, such as in scenarios described in the above example.

Technical solutions are described herein to address the technical challenges of combining image-based data with recordings of a laser scanner without the use of additional targets or markers that need to be placed in the scenery. Further, aspects of the technical solutions described herein facilitate the registration of two or more point clouds captured by a scanner (e.g., terrestrial scanner) using one or more images captured by another device (e.g., drone). The images captured by the another device can be panoramic (e.g., wide-angle images, ultra-wide-angle images, etc.)

Aspects of the technical solutions described herein facilitate using the captured data from varied data sources, i.e., measurement devices, together. Aspects of the technical solutions described herein facilitate determining the captured data that are to be registered together and proceeding with such registering so that a user can obtain a holistic view of the environment and at least the portion for which data was captured. Such processing, including determining the relevant captured data and their registration, is performed automatically in one or more aspects. There are several technical challenges with using the data from such varied data sources together.

The technical challenges include identifying which two (or more) captured data are relevant for registering. The technical challenges further include that the captured data can be in different coordinate systems of the respective data sources. That is because the pose, i.e., position and orientation, of the respective measurement device can be different at the time of data capture. Aspects of the technical solutions described herein address such technical challenges using images captured by cameras associated with the 3D scanner devices, for example, color cameras and/or infrared cameras. The images captured by the various measurement devices (e.g., scanners, cameras, etc.) can use wide-angle or ultrawide-angle lenses in one or more aspects. The cameras that capture the images can be internal to the measurement devices (e.g., part of the scanner) and/or external to the measurement devices (e.g., attached externally to a scanner, drone, etc.).

Aspects of the present disclosure provide technical solutions to technical challenges in measurement devices. The measurement devices can capture two-dimensional or three-dimensional (3D) scans or measurements. Such measurements/scans can include 3D coordinates, 2D maps, 3D point clouds, or a combination thereof. The measurements/scans can include additional components, such as annotations, images, textures, measurements, and other details.

As used herein, the term "mobile computing device" refers to a computing device having one or more processors, a display, and non-transitory memory that includes computer-readable instructions. The mobile computing device also includes a power source, such as a battery for example, that allows a user to move about the environment with the mobile computing device. The mobile computing device is sized and shaped to be carried by a single person. In an aspect, the mobile computing device may be but is not limited to a cellular phone, a smartphone, a personal digital assistant, a tablet computer, a laptop computer, or a convertible laptop computer, for example.

Data captured by a measurement device for an area is sometimes collectively referred to as a "scan." The data can include 3D coordinates of one or more points (point cloud) in the area that is scanned, as well as an image that represents color and/or intensity of the scanned area. Typically, when capturing a scan of an environment, a version of the simultaneous localization and mapping (SLAM) algorithm is used. For completing such scans, a scanner, such as the FARO® SCANPLAN®, FARO® SWIFT®, FARO® FREESTYLE®, or any other measurement system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which are incorporated by reference herein in its entirety. This type of scanner may also be combined with another scanner, such as a time of flight scanner, as is described in commonly owned U.S. patent application Ser. No. 16/567,575, the contents of which are incorporated by reference herein in its entirety. It should be noted that the scanners listed above are just examples of measurement devices and that the type of scanner used in one or more aspects does not limit the features of the technical solutions described herein.

FIG. 1 depicts a system for capturing measurements in an environment according to one or more aspects. The measurement system 100 includes a computing system 110 coupled with one or more measurement devices 120A, B (collectively 120). It should be noted that although only two measurement devices 120A,B are depicted, in one or more aspects, there can be an additional number of measurement devices 120. The coupling facilitates wired and/or wireless communication between the computing system 110 and the measurement device 120. The communication can be performed in a wired or wireless. In some aspects the data can be shared between two devices by transferring one or more memory devices (e.g., disk drive, flash drive, etc.) from one device to another. The measurement devices 120 can include a 2D scanner, a 3D scanner, a camera, a drone-based camera, or any other measurement device or a combination thereof.

In one or more aspects, data captured by two types of measurement devices are used in conjunction. For example, a first type of measurement device 120A ("first measurement device") and a second type of measurement device 120B ("second measurement device") are used to capture respective data, a first captured data 125A and second captured data 125B (collectively, captured data 125). The captured data 125 from the measurement devices 120 includes measurements of a portion from the environment. The captured data 125 is transmitted to the computing system 110 for storage. The computing device 110 can store the captured data 125 locally, i.e., in a storage device in the computing device 110 itself, or remotely, i.e., in a storage device that is part of another computing device 150. The computing device 150 can be a computer server or any other type of computing device that facilitates remote storage and processing of the captured data 125.

The captured data 125A from the first measurement device 120A, e.g., drone-based camera, can include 2D images. The captured data 125B from the second measurement device 120B, e.g., a 3D scanner, can include one or more point clouds, a distance of each point in the point cloud(s) from the measurement device 120, color information at each point, radiance information at each point, and other such sensor data captured by the set of sensors 122 that is equipped on the second measurement device 120. For example, sensors 122 can include a LIDAR 122A, a depth camera 122B, a camera 122C, etc. The 2D images can be panorama images (e.g., wide-angle images, ultra-wide-angle images, etc.) in some cases.

The measurement device 120 can also include an inertial measurement unit (IMU) 126 to keep track of a pose, including a 3D orientation, of the measurement device 120. Alternatively, or in addition, the captured data 125 the pose can be extrapolated by using the sensor data from sensors 122, the IMU 126, and/or from sensors besides the range finders.

In one or more aspects, the measurement device 120, for example, drone-based cameras, can also include a global positioning sensor (GPS) (not shown) or another such location-sensing module that facilitates identifying a global position of the measurement device 120. While there are solutions that use drone photogrammetry using GPS information for example, for scaling, such techniques have significant errors (~5-10%) because of the errors in the kinematic GPS measurement. While such techniques may be suitable for generating maps of large spaces (e.g., 5 square miles+) where the lower accuracy can be compensated, such errors are not acceptable when generating a map of a relatively smaller area, such as an office building, a factory, an industrial floor, a shopping mall, a construction site, and the like.

Figure 2A:
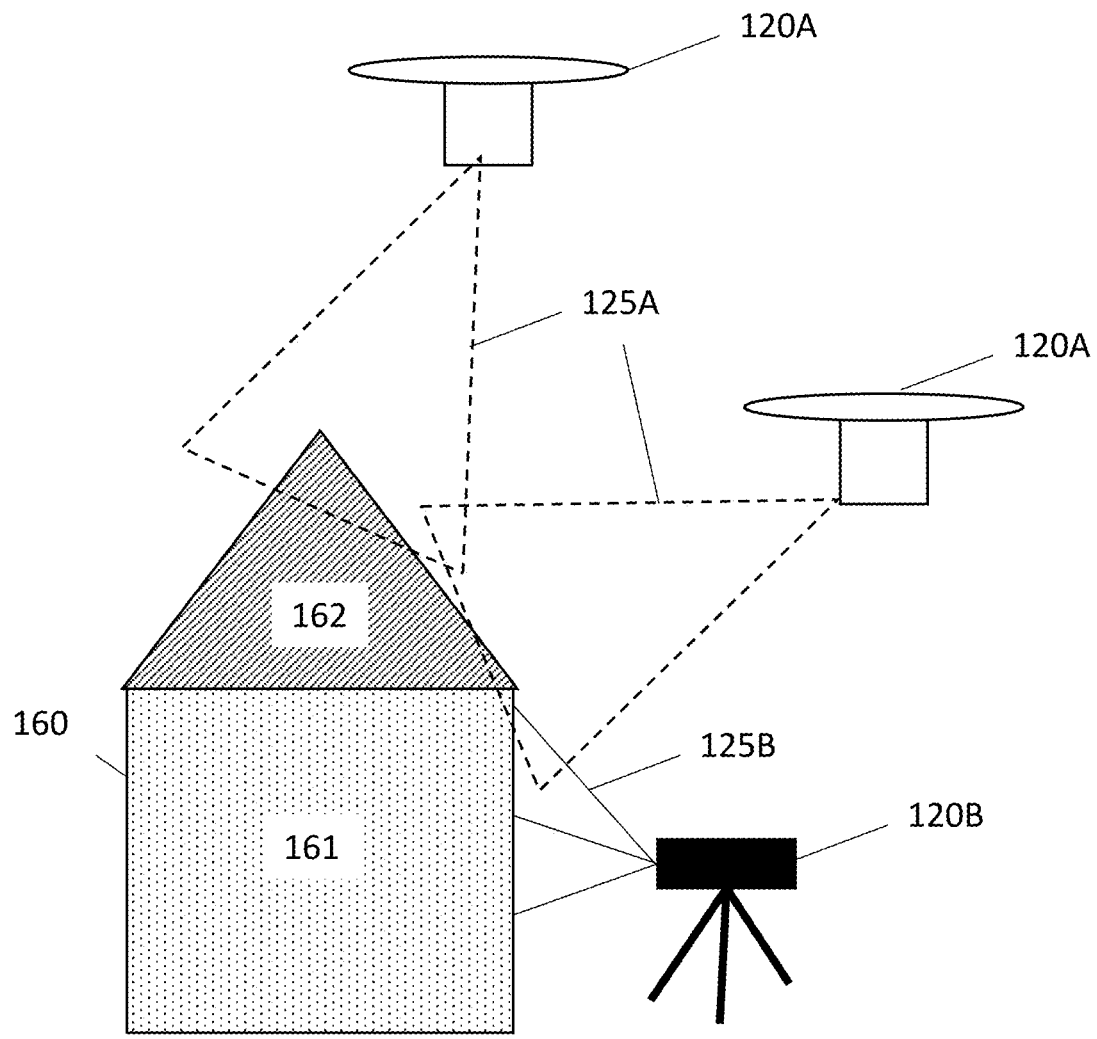
FIG. 2A depicts an example scenario according to one or more aspects.

FIG. 2A depicts an example scenario according to one or more aspects. A terrestrial laser scanner ("scanner") 120B scans and captures data 125B of a façade 161 of a building 160. The data 125B can include 3D point clouds of the façade 161. The data 125B also includes a 2D image of the façade 161. The 2D image can be captured by the camera 122C or any of the other sensors 122. The camera 122C can be an internal camera of the scanner 120B. Alternatively, or in addition, the camera 122C can be an external camera that is attached to the scanner 120B. The camera that captures the 2D image (also referred to as "second 2D image") is separate from the first type of measurement device 120A. The second 2D images can be panoramic images in some aspects. The corresponding 2D images (i.e., second 2D images) can be color images or intensity images. In some cases, the second 2D image can be a computationally generated image based at least in parts on the recorded 3D data. In some cases, the second 2D image can be computationally generated using machine learning using one or more known techniques are techniques later developed. The geometric relation of the 2D image with respect to the recorded 3D data is known, for example, based on a known relative positions between the camera with respect to the 3D scanner. The scanner 120B is not able to get data on roof 162. The data representing roof 162 can be done cost-effectively with a camera 120A, which may be mounted on a drone. Multiple images 125A from different drone positions can be recorded by the drone-based camera 120A. Additionally, one or more of images 125A, for example, lower-lying images, are captured to overlap with the field-of-view of the scanner 120B, and images captured by the laser scanner to allow for the proposed method. Here, an "overlap" includes at least one portion of the surrounding environment being captured by both a 2D image and a 3D scan.

Figure 2B:
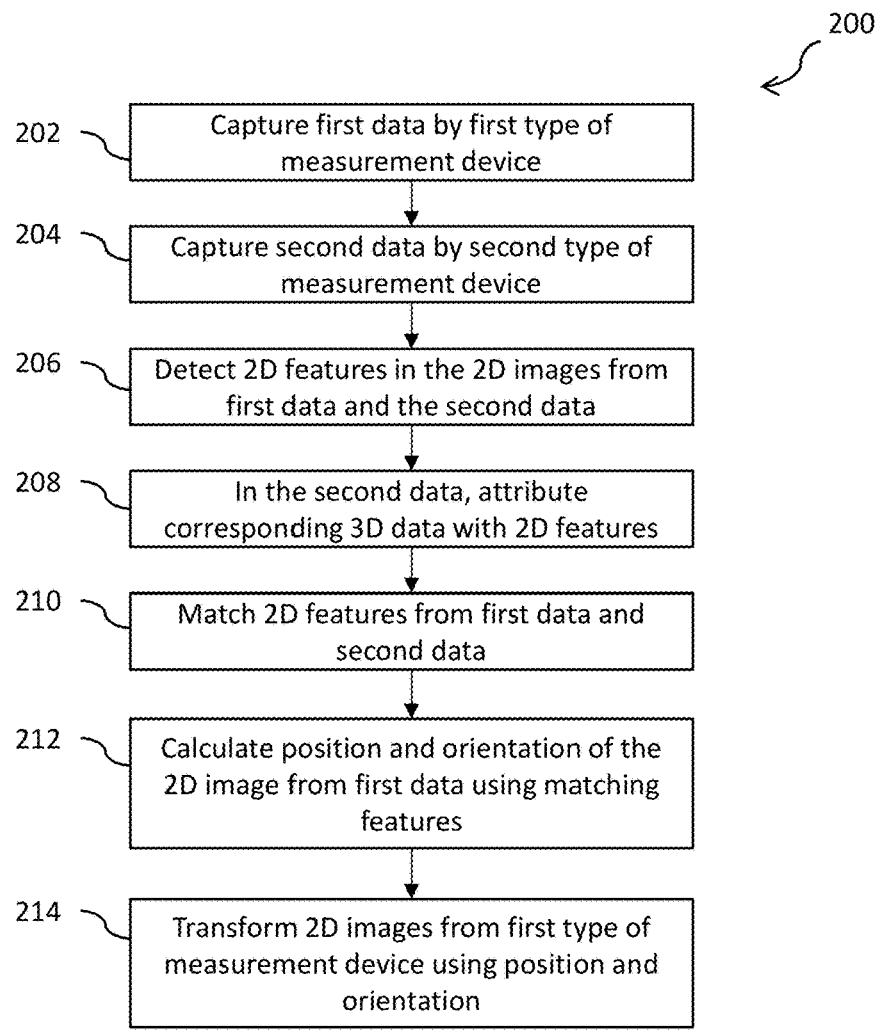
FIG. 2B depicts a flowchart for a method for automatically registering captured data from different types of data sources according to one or more aspects.

FIG. 2B depicts a flowchart for a method 200 for automatically registering captured data from different types of data sources according to one or more aspects. Method 200 is described in the context of the example scenario of FIG. 2A, however, it is understood that method 200 is applicable in other example scenarios as well.

Method 200 includes capturing and storing, by a first type of measurement device 120A, the first captured data 125A for a portion of the environment, at block 202. In the above example, the first captured data 125A includes images captured by the 2D drone-based camera 120A. The images can be panoramic images in some aspects. It is understood that while drone-based images are used as an example of the first captured data 125A, any camera and any method of camera movement may be used in one or more aspects.

At block 204, a second type of measurement device 120B captures a second captured data 125B of another portion of the (same) environment. The second type of measurement device 120B uses a different sensor than that from the first type of measurement device 120A. For example, the second type of measurement device 120B is a 3D scanner that captures 3D scans representing surfaces in the scanned portion, while the first type of measurement device 120A is a 2D camera that captures 2D images of the environment. The 3D scans captured by the scanners can include point clouds that include 3D data coordinates representing the surfaces along with images of the surfaces. The images in the second captured data 125B may be color images or greyscale intensity images (based on IR reflectivity).

In some aspects, the portion captured in the first captured data 125A and in the second captured data 125B has at least a predetermined overlapping area. The first captured data 125A and the second captured data 125B can be captured concurrently in some aspects. Alternatively, the two data 125A, B, can be captured sequentially in other aspects.

At block 206, for registration, image features are searched in the (drone) images from the first captured data 125A and the images from the 3D scans in the second captured data 125B. Example methods to detect the 2D image features are SIFT, SURF, BRIEF, or ORB, which are commonly known in image processing. The extracted 2D image features are described by a so-called descriptor which helps to identify the features across different images even when the features are observed from different perspectives, different distances, or with different sensors.

At block 208, in the case of the second captured data 125B, the corresponding 3D coordinates from the point clouds are attributed to the 2D features found in the image from the 3D scan. The geometric relation between the 3D coordinates and the 2D features are determined from the system calibration of the laser scanner and the (internal or external) camera, which records the image in the second captured data 125B. In case of a computationally generated 2D image based on the recorded 3D data, the geometric relation is known from the calculation process.

At 210, matching 2D features are identified from the first captured data 125A and the second captured data 125B. The matching of 2D features across all images can be done using brute force algorithm or with algorithms such as FLANK (fast approximate nearest neighbor search algorithm). The 3D scan from the second captured data 125B is deemed to "match" with a 2D image from the first captured data 125A if at least a predetermined number (e.g., four, five, eight, etc.) of 2D features match between the first captured data 125A and the second captured data 125B. The position and orientation of a 2D image 125A with respect to the 3D position of the scanner 120B can be found with a perspective n point algorithm. The calibrated intrinsic parameters of the devices need to be known or calculated (e.g., using bundle adjustment) for such mapping (e.g., the focal length and the principle point of the camera, the distortion parameters, etc.).

In some aspects, the predetermined number of matching features from the second captured data 125B (3D scan) have to have corresponding 3D coordinates in the point cloud.

The list of 3D-to-2D feature correspondence serves as control or anchor points in the subsequent operations described herein. The existence of the 3D data helps to find the stable position between images in the first captured data 125A and the 3D scan in the second captured data 125B. Furthermore, because the 3D data captured in the second captured data 125B is dimensionally accurate, it also helps to correctly scale the photogrammetry data, i.e., the first captured data 125A. If two or more images 125A can be located in the coordinate system of a scanner 120B, the 3D data from the drone images is automatically correctly scaled.

The covered object might be very large and several 3D scans 125B are recorded around it. If we have a first scan position and a second scan position for the scanner 120B, we may locate one or more images 125A to any of these positions. If the data from the first position and second position can be registered due to 3D content overlap, we can allow one 2D image 125A to be localized with respect to the first position and one 2D image 125A to be localized with respect to the second position. This will also automatically scale the resulting photogrammetry data based on images 125A.

In one or more embodiments, to optimize the matching of the 2D features between the first captured data 125A and the second captured data 125B, optimization techniques, such as ransac (to eliminate outliers), on-the-fly camera calibration (to give a better estimate of intrinsic calibration values), etc. are used.

At block 212, the position and orientation of the 2D image in the first captured data are calculated in the coordinate system of the 3D scan with the help of the matched features and at least four associated 3D coordinates. In some aspects, the transformed 2D image from the first captured data 125A is displayed in conjunction with the 3D data.

Based on the calculated positions of one or more images 125A, the 3D representations of the captured area can be calculated e.g., with semi global matching. The retrieved connection of one or more images 125A within the coordinate system of one or more laser scans 125B puts all 3D data in the same coordinate system. Thereby the photogrammetry data adds missing 3D data that cannot be captured due to limitations of the scanner and/or limitations to place the scanner.

For example, the matching can result in a single 2D image from the second captured data 125B to match with a single 2D image from the first captured data 125A.

As noted earlier herein, although the single image from the first captured data 125A can be placed in the correct position using known photogrammetric calculation, the scale cannot be matched. In the calculation above, a second located 2D image from the drone-based camera 120A is required to fix the scale for the photogrammetry 2D image in the first captured data 125A. A single 2D image from the first captured data 125A can be individually matched to one or more 3D scans (125B) from the second measurement device 120B (e.g., scanner). Because the 2D images in the first captured data 125A are recorded for photogrammetric processing with overlapping areas, the 2D images typically contain areas of the scene with no overlap therefore, they cover more areas compared to the area, which is intended for 3D reconstruction. Hence, corresponding matches between the 2D images from the first captured data 125A and the image from the 3D laser scan in the second captured data 125B are typically available because of an overlapping area in a 2D image and an image from the 3D laser scan. Furthermore, because the 2D images are taken with a large spatial overlap, more than one 2D image can be matched to a single 3D laser scan.

At 214, in some aspects, other 2D images captured by the first type of measurement device 125A (e.g., drone-based camera) are transformed using the position and orientation calculation derived from the above calculation to determine the position and orientation. For example, a first 2D image from the first captured data 125A is used to determine the position and orientation in the coordinate system of the 3D scans in the second captured data 125B. The position and orientation calculation is then used to transform a second 2D image from the first captured data 125A into the coordinate system of the second captured data 125B. In some aspects, the position/orientation calculation determined can be used in for other subsequent calculations/operations, alternatively, or in addition to transforming the other 2D images.

By using the transformation calculated for the first image to transform the other images from the first captured data 125A, one or more aspects can improve the efficiency of generating map 130. In one or more aspects, during the photogrammetric processing, all the 2D images from the first measurement device 120A have to be oriented (with respect to each other). This calculation is based on the collinearity equations. The refinement of an approximate image orientation is done by the so-called bundle adjustment. During this process, one or more images with the corresponding features and 3D points of the features can be added as constraints to the bundle adjustment. It means that localization and scaling of the 2D images from the first captured data 125A (e.g., drone data) is done in one step altogether within the same bundle adjustment. For example, in some respects, at least 2 images from the first type of measurement device 120A (e.g., drone) must have at least 3 feature matches with the collection from the second type of measurement device 125B (e.g., 3D laser scans). It is understood that the number of images and number of features in the above example can be varied in one or more aspects.

Aspects of the technical solutions described herein can not only be used to register image-based data to a 3D laser scan but can also be used to register two different 3D laser scans to each other, or to register a 3D laser scan with an image-based data. For example, technical challenges exist when the 3D overlap between two laser scans is insufficient for effective registration of one 3D laser scan with another 3D laser scan (e.g., cloud2cloud registration).

Figure 3A:
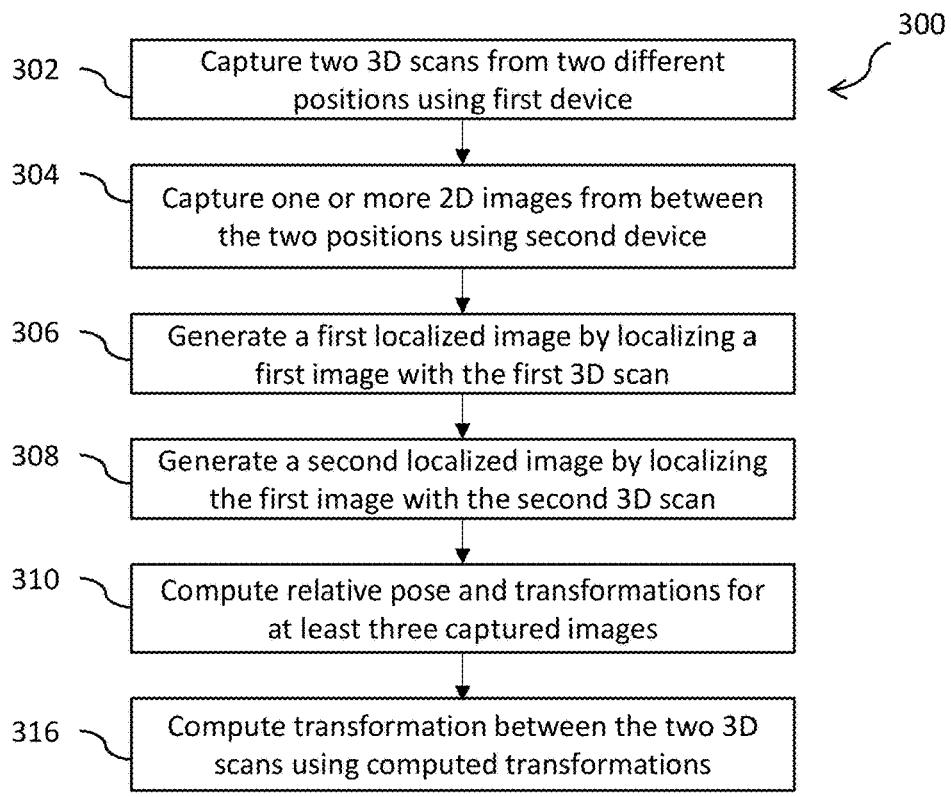
FIG. 3A depicts a flowchart of a method for scanner-to-scanner registration using 2D images according to one or more aspects.
Figure 3B:
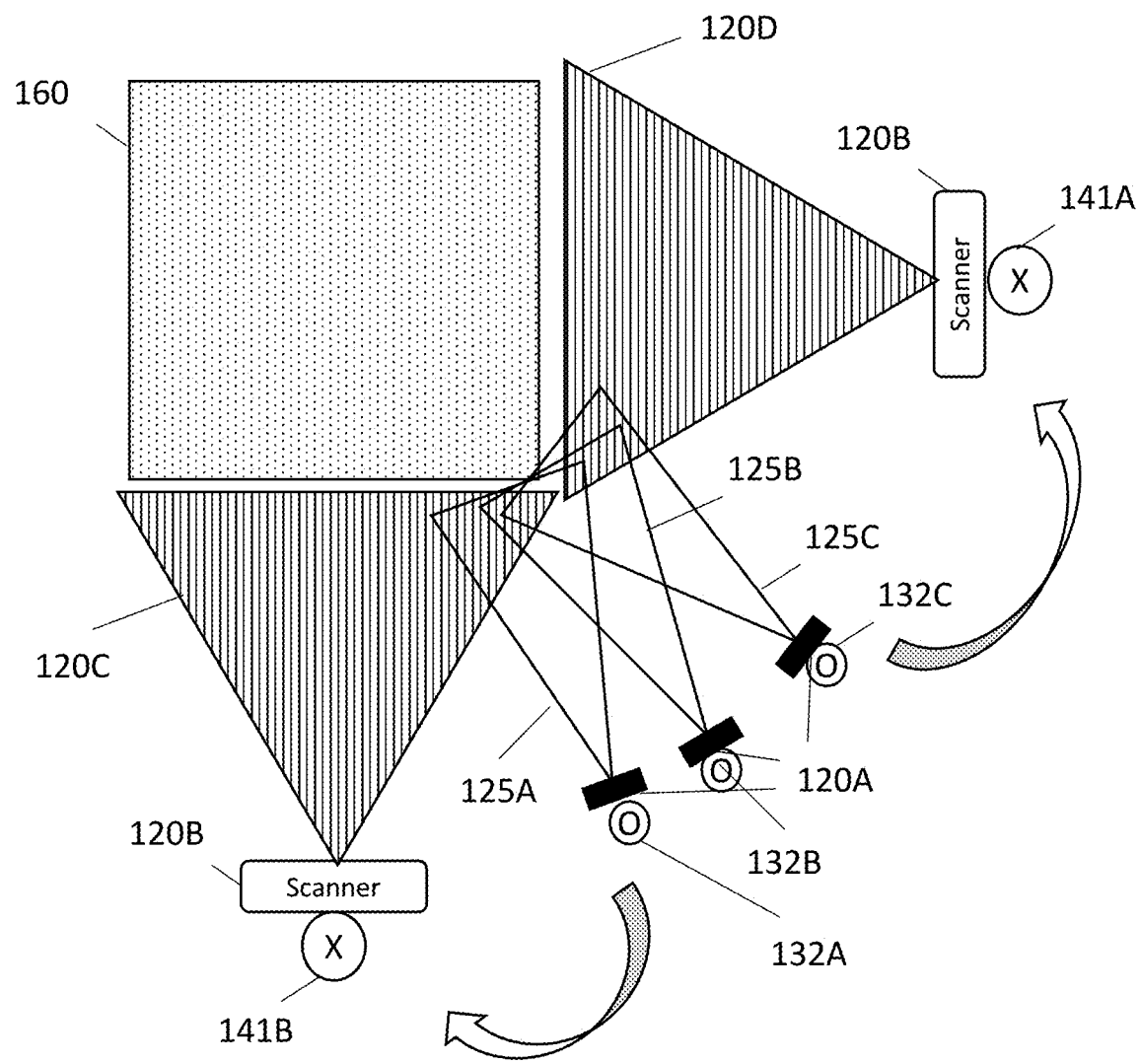
FIG. 3B depicts an example scenario that will be used to describe method in FIG. 3A.

FIG. 3A depicts a flowchart of a method 300 for scanner-to-scanner registration using 2D images according to one or more aspects. FIG. 3B depicts an example scenario that will be used to describe method 300. It is understood that the technical solutions described herein are applicable in scenarios other than the example scenario. As shown in the example in FIG. 3B, at block 302, the scanner 120B is used to capture 3D scans 120C and 120D of the surrounding (e.g., building 160), from a first position 141A and a second position 141B. The two 3D scans 120C and 120D capture the surrounding from different perspectives of the two positions, 141A, 141B.

Method 300 further includes, at block 304, capturing one or more 2D images 125A, 125B, 125C, of the surrounding from one or more positions 132A, 132B, 132C, respectively, located between the first position 131A and the second position 131B from which the 3D scanner 120B captures the 3D scans 120C, D, respectively.

At 306, at least one of the 2D images, say 125A, is localized with respect to the first 3D laser scan 120C using method 200 based on the 2D feature detection and comparison or any other technique. The localization facilitates computing a first transformation between the 2D image 125A and the first 3D laser scan 120C. The localization results in a first localized image separate from the image 125A. It should be noted that in some aspects, additional first localized images are computed by localizing the additional 2D images 125B,C with respect to the first 3D laser scan 120C.

At 308, the same image(s) 125A is localized with respect to the second laser scan 120D using method 200 based on the 2D feature detection and comparison or any other technique. The localization facilitates computing a second transformation between the 2D image 125A and the second 3D laser scan 120D. The localization results in a second localized image separate from the image 125A. It should be noted that in some aspects, additional second localized images are computed by localizing the additional 2D images 125B,C with respect to the second 3D laser scan 120D.

At 310, relative positions between the at least 3 images (first scan, second scan, 2D image capture) are computed using feature comparison, image positions estimation, and bundle adjustment. In some aspects, each image 125 can be localized individually to the scanner position, while in other aspects the relative positions are all computed in a single step. For example, if there are multiple 2D images 125 at least one of the 2D images 125 can be localized to the first scanner position and at least one of 2D images (same 2D image, or different 2D image) can be localized to the second scanner position. Additionally, each image 125 is localized with respect to at least one other 2D image 125. It should be noted that 2D image 125A need not be localized to a 2D image 125C if both images are localized to a common 2D image 125B.

At block 316, using the three calculated transformations between localized images and recorded images 125A, B, C, and individual 3D laser scans 120C,D, the transformation between the two 3D laser scans 120C,D is calculated. Here, the three calculated transformations are 1) first localized image→second localized image; 2) first localized image-→first 3D laser scan 120C; and 3) second localized image-→second 3D scan 120D.

Also, if the two localized images are deemed identical (312), the 3D transformation between the first localized image→first 3D scan 120C, and between the second localized image→second 3D scan 120D are used to determine the transformation between the first 3D scan 120C and the second 3D scan 120D for registering the two 3D scans with each other.

In this manner, the two 3D laser scans 120C, D, can be registered with each other using the 2D images computed by the second type of measurement device, e.g., a drone-based camera. The registered 3D laser scans can then be used to generate map 130. This procedure may be applied after the actual recording of the 3D laser scans 120C, D, for example, when problems with the registration are observed. By facilitating the registration in this manner, the technical solutions provided herein remove the need for a (costly) acquisition of a new 3D laser scan with the laser scanner. Aspects of the technical solutions described herein, accordingly, provide a practical application to a technical challenge in the field of generating a map of a surrounding environment using measurement devices.

Referring to the example shown in FIG. 3B, it should be noted that a laser scanner 120 typically records a full sphere and not only in a finite angle as depicted here. Nevertheless, on many occasions, only a small portion is relevant (e.g., only building 160 is of interest and not the surroundings), and the environment may not provide stable enough 3D features for a scan-to-scan registration. For example, there may be moving cars, shaking trees that occupy the scenery seen by both scanners, but due to their movement, and hence, they cannot be used for ICP or would massively distort the result. Furthermore, some occlusions may be present to prevent a stable registration. In FIG. 3B, three image positions 132A, B, C are shown, and due to the content overlap in the three 2D images 125A-C, the 2D images 125A-C can be registered with respect to each other. Furthermore, the left image 125A can be located in the coordinate system of the first 3D scan 120C, and the third image 125C can be located in the coordinate system of the second 3D scan 120D.

In other aspects, more 2D images may be captured and used. In some aspects, a single 2D image 125A, which can be located in both laser scan coordinate systems, can be used to register the two 3D scans.

Figure 4:
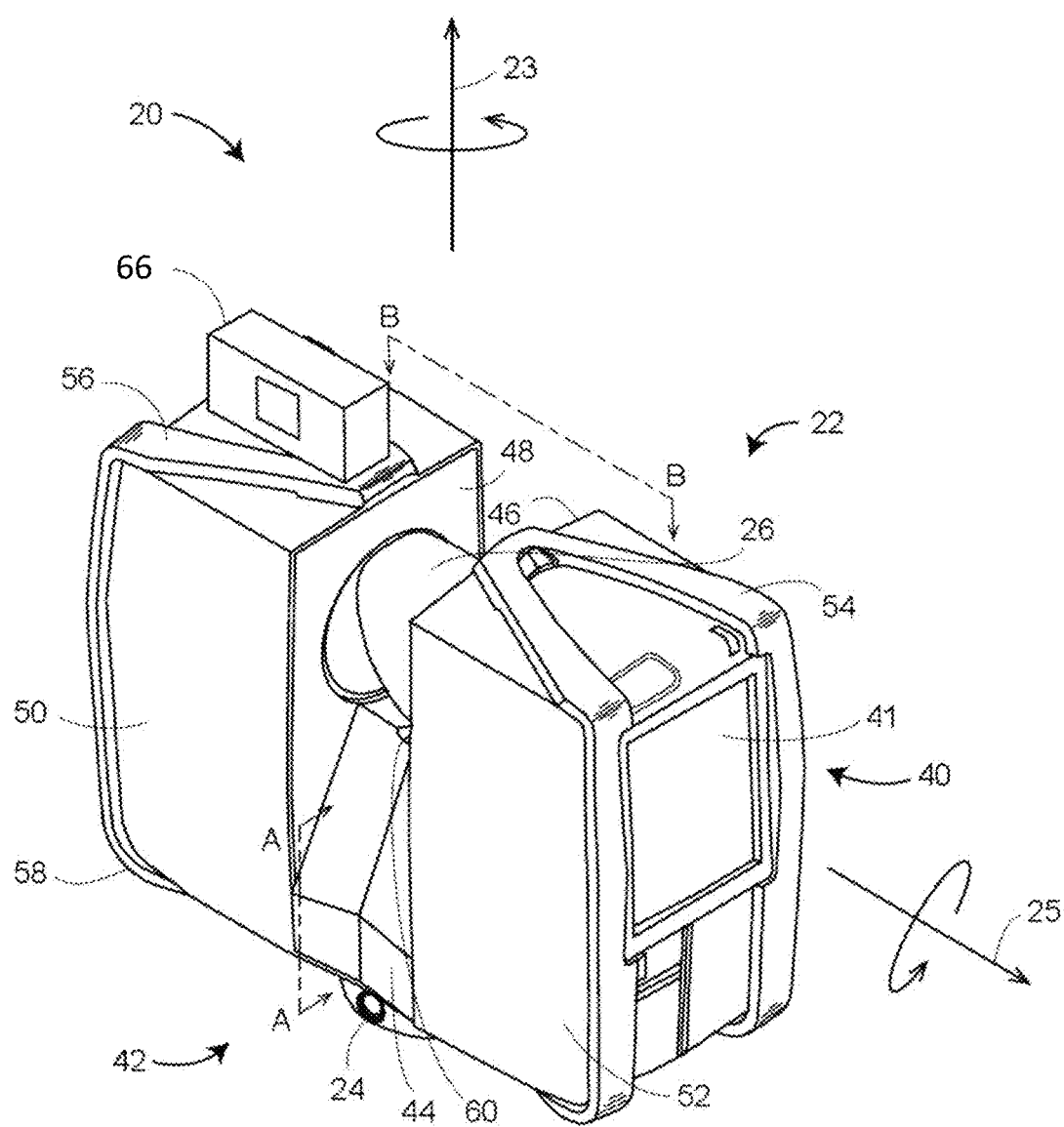
FIGS. 4, 5, and 6 depict a laser scanner for optically scanning and measuring the environment surrounding the laser scanner.
Figure 5:
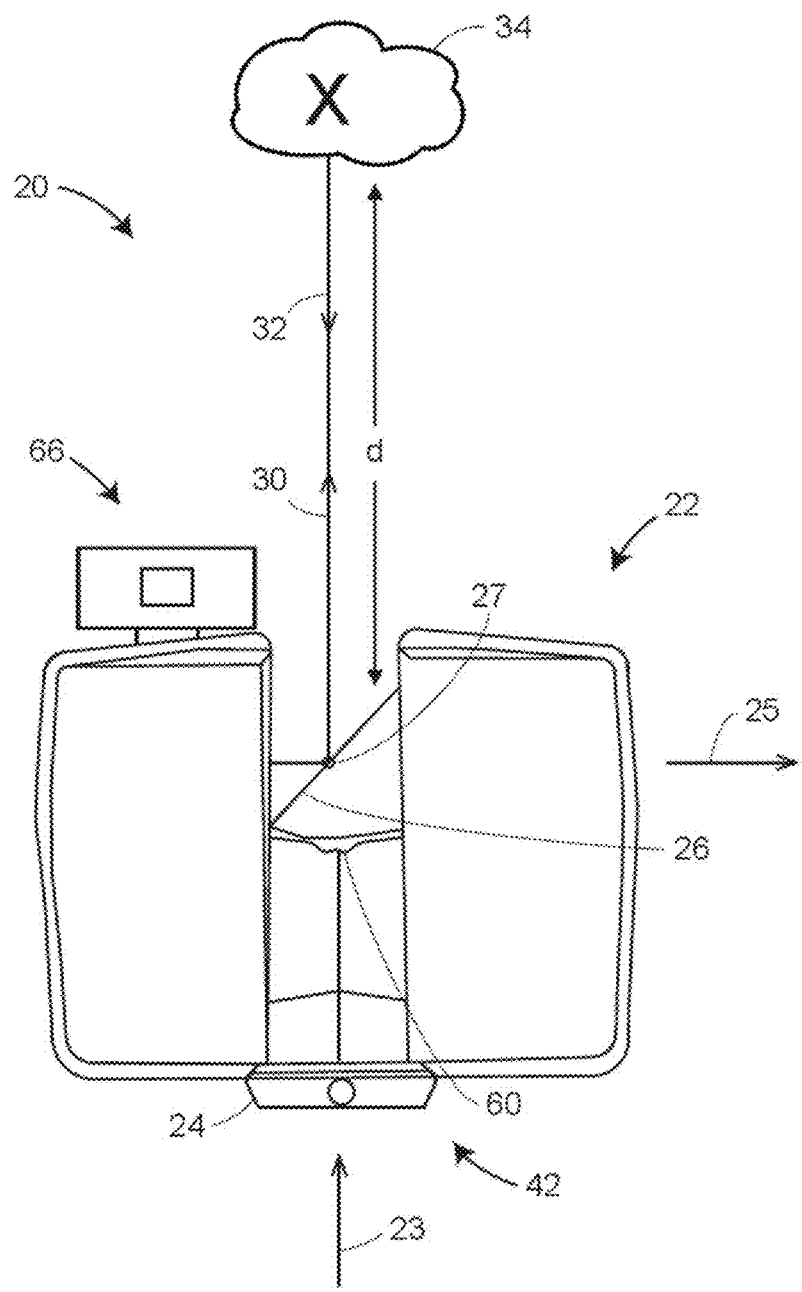
Figure 6:
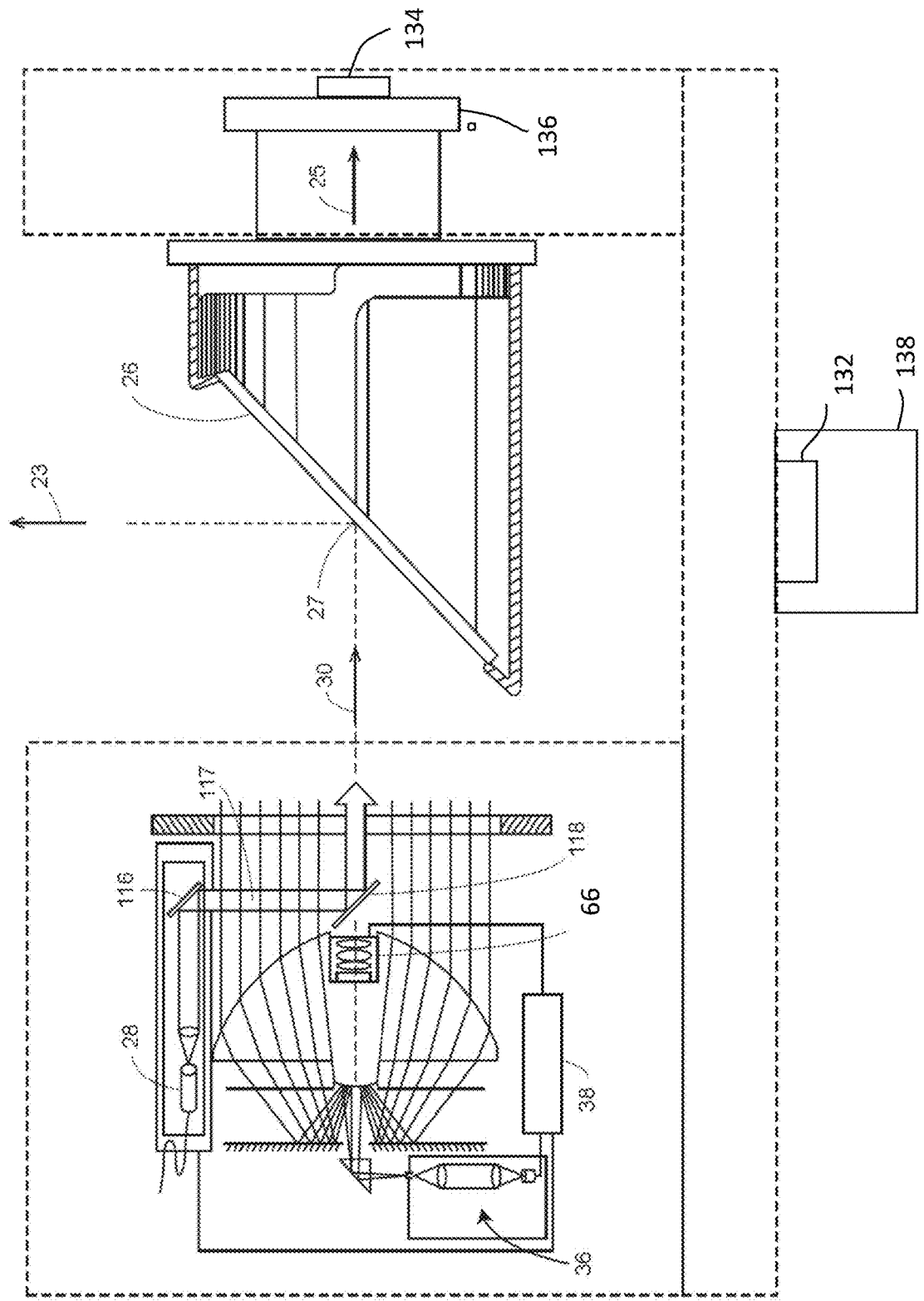

Referring now to FIGS. 4-6, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one aspect, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one aspect, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 5), a corresponding number of distances d between the laser scanner 20 and the points X on object 34. The distance to a particular point X is determined based at least in part on the speed of light in air through which electromagnetic radiation propagates from the device to the object point X. In one aspect the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, method of triangulation enables the distance to the object to be determined based on one known length and two known angles of a triangle. Method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary aspect, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one aspect, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary aspect, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary aspect, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary aspect, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other aspects, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary aspect, the prism 60 is integrally formed as part of the carrying structure 42. In other aspects, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an aspect, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary aspect, the resulting correction of distance is performed by the controller 38.

In an aspect, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an aspect, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an aspect, the auxiliary image acquisition device 66 is a color camera with an ultrawide-angle lens, sometimes referred to as a "fisheye camera."

In an aspect, the camera 66 is located internally to the scanner (see FIG. 3) and may have the same optical axis as the 3D scanner device. In this aspect, the camera 66 is integrated into the measuring head 22 and arranged to acquire images along the same optical pathway as emitted light beam 30 and reflected light beam 32. In this aspect, the light from the light emitter 28 reflects off a fixed mirror 116 and travels to dichroic beam-splitter 118 that reflects the light 117 from the light emitter 28 onto the rotary mirror 26. In an aspect, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other aspects, the determination of whether the light passes through the beam-splitter 118 or is reflected depends on the polarization of the light. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 7:
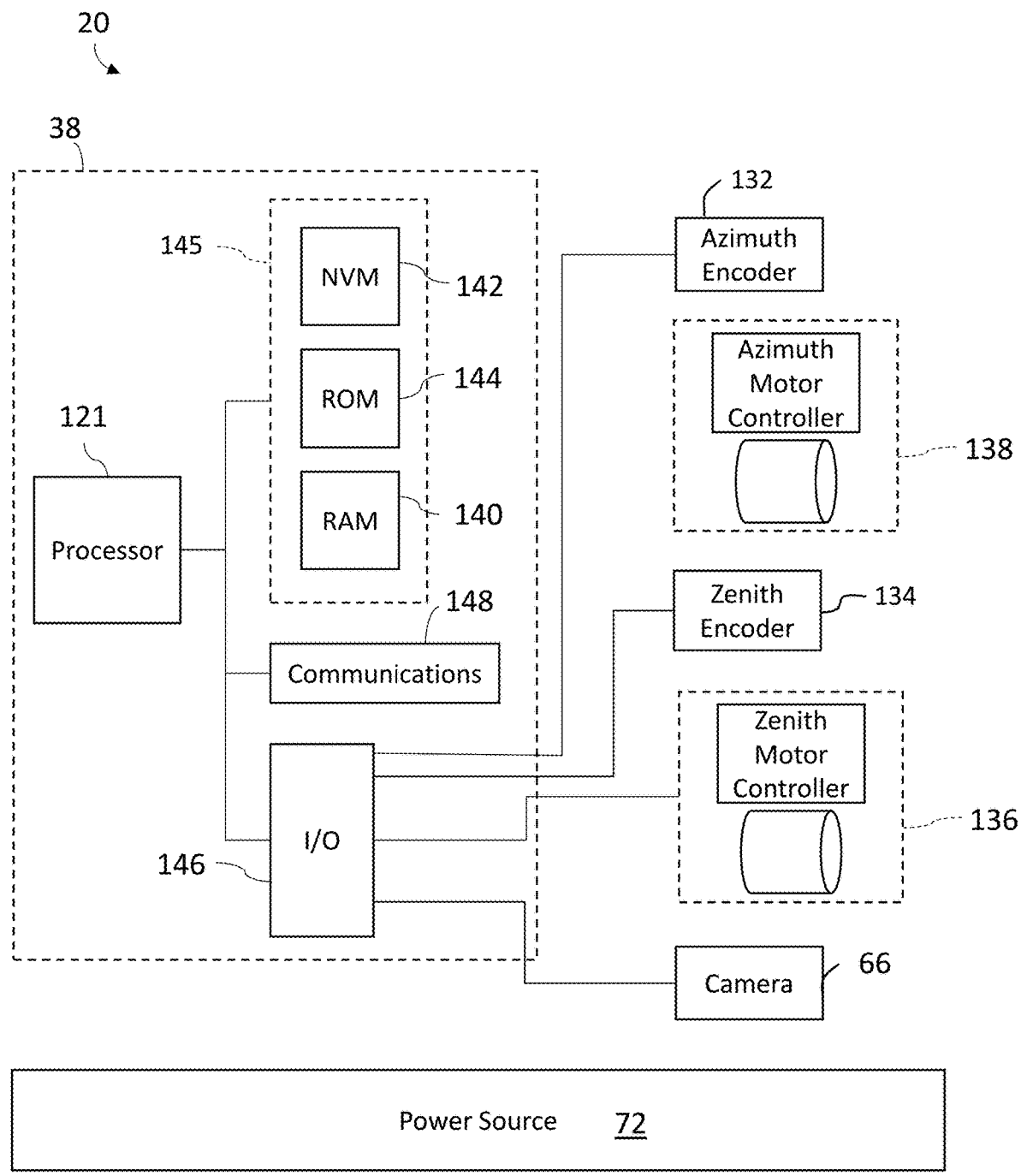
FIG. 7 shows a block diagram of elements of a laser scanner according to one or more aspects.

Referring now to FIG. 7 with continuing reference to FIGS. 4-6, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 121 have access to memory 125 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 66, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 66 and is given certain instructions for the purpose of generating a 3D point cloud of a scanned environment. Controller 38 provides operating signals to the light source 28, light receiver 36, panoramic camera 66, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one aspect, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 121 are coupled to memory 125. The memory 125 may include random access memory (RAM) device 140, a non-volatile memory (NVM) device 142, and a read-only memory (ROM) device 144. In addition, the processors 121 may be connected to one or more input/output (I/O) controllers 146 and a communications circuit 148. In an aspect, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 121, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Figure 8:
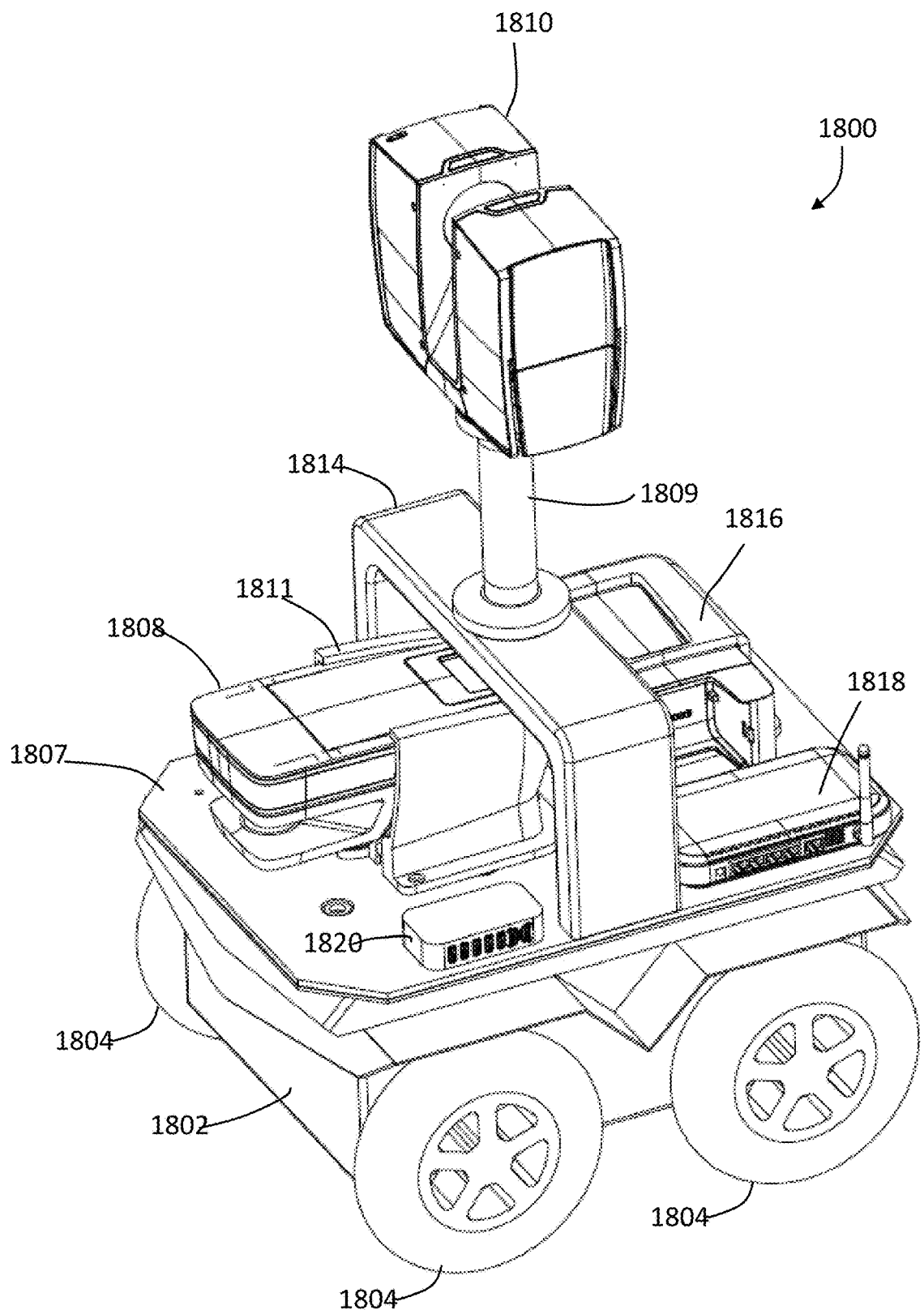
FIGS. 8-10 depict an aspect of a mobile scanning platform.
Figure 9:
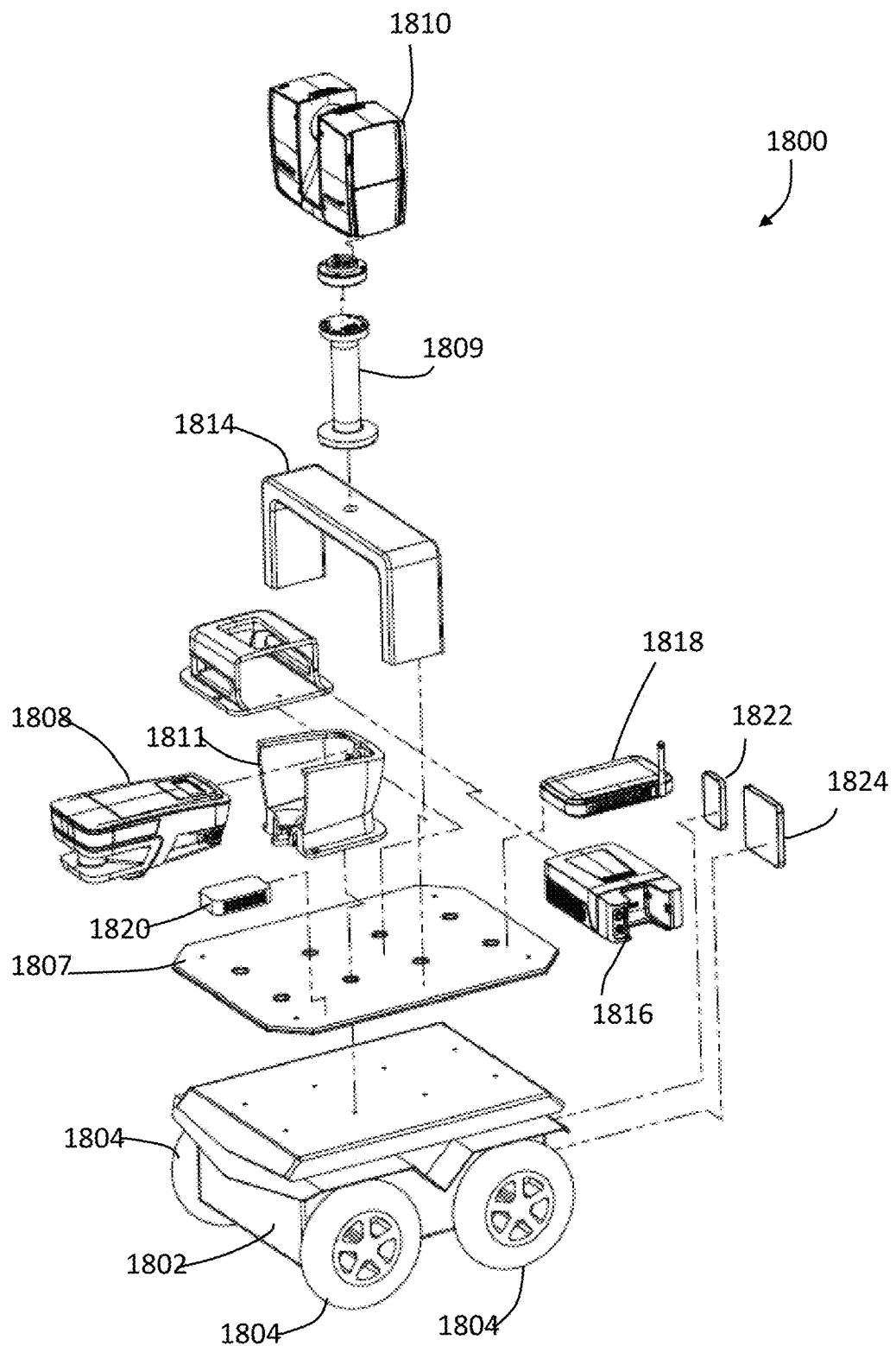
Figure 10:
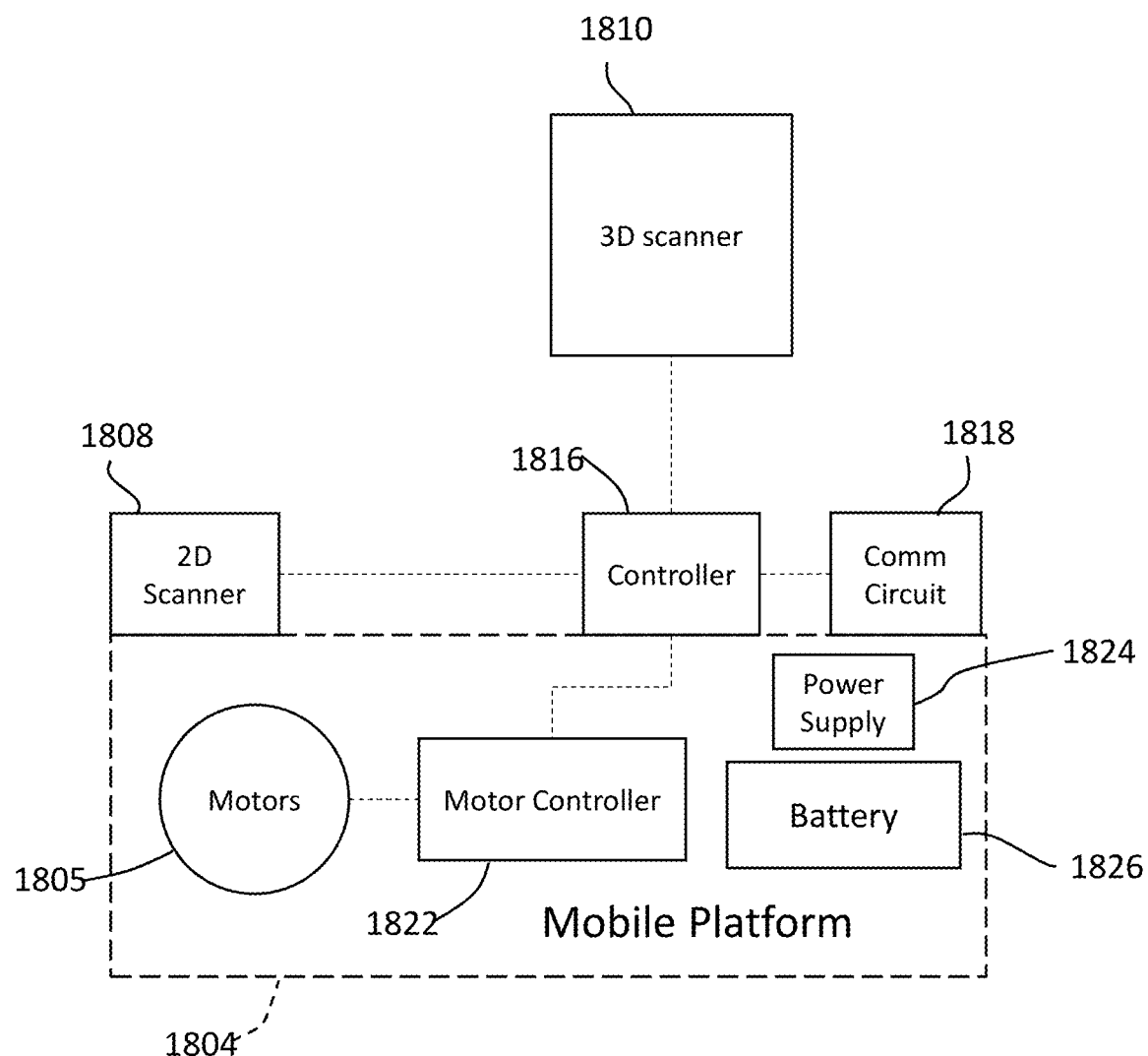

Referring now to FIGS. 8-10, an aspect is shown of a mobile scanning platform 1800. The mobile scanning platform 1800 can be used as the scanner 120. The mobile scanning platform 1800 includes a base unit 1802 having a plurality of wheels 1804. The wheels 1804 are rotated by motors 1805. In an aspect, an adapter plate 1807 is coupled to the base unit 1802 to allow components and modules to be coupled to the base unit 1802. The mobile scanning platform 1800 further includes a 2D scanner 1808 and a 3D scanner 1810. In the illustrated aspect, each scanner 1808, 1810 is removably coupled to the adapter plate 1806. The 2D scanner 1808 may be the scanner illustrated and described herein. As will be described in more detail herein, in some aspects the 2D scanner 1808 is removable from the adapter plate 1806 and is used to generate a map of the environment, plan a path for the mobile scanning platform to follow, and define 3D scanning locations. In the illustrated aspect, the 2D scanner 1808 is slidably coupled to a bracket 1811 that couples the 2D scanner 1808 to the adapter plate 1807.

In an aspect, the 3D scanner 1810 is a time-of-flight (TOF) laser scanner such as that shown and described herein. The scanner 1810 may be that described in commonly owned U.S. Pat. No. 8,705,012, which is incorporated by reference herein. In an aspect, the 3D scanner 1810 mounted on a pedestal or post 1809 that elevates the 3D scanner 1810 above (e.g. further from the floor than) the other components in the mobile scanning platform 1800 so that the emission and receipt of the light beam is not interfered with. In the illustrated aspect, the pedestal 1809 is coupled to the adapter plate 1807 by a u-shaped frame 1814.

In an aspect, the mobile scanning platform 1800 further includes a controller 1816. The controller 1816 is a computing device having one or more processors and memory. The one or more processors are responsive to non-transitory executable computer instructions for performing operational methods such as those described herein. The processors may be microprocessors, field programmable gate arrays (FPGAs), digital signal processors (DSPs), and generally any device capable of performing computing functions. The one or more processors have access to memory for storing information.

Coupled for communication to the controller 1816 is a communications circuit 1818 and an input/output hub 1820. In the illustrated aspect, the communications circuit 1818 is configured to transmit and receive data via a wireless radio-frequency communications medium, such as WIFI or Bluetooth for example. In an aspect, the 2D scanner 1808 communicates with the controller 1816 via the communications circuit 1818

In an aspect, the mobile scanning platform 1800 further includes a motor controller 1822 that is operably coupled to the control the motors 1805. In an aspect, the motor controller 1822 is mounted to an external surface of the base unit 1802. In another aspect, the motor controller 1822 is arranged internally within the base unit 1802. The mobile scanning platform 1800 further includes a power supply 1824 that controls the flow of electrical power from a power source, such as batteries 1826 for example. The batteries 1826 may be disposed within the interior of the base unit 1802. In an aspect, the base unit 1802 includes a port (not shown) for coupling the power supply to an external power source for recharging the batteries 1826. In another aspect, the batteries 1826 are removable or replaceable.

Figure 11:
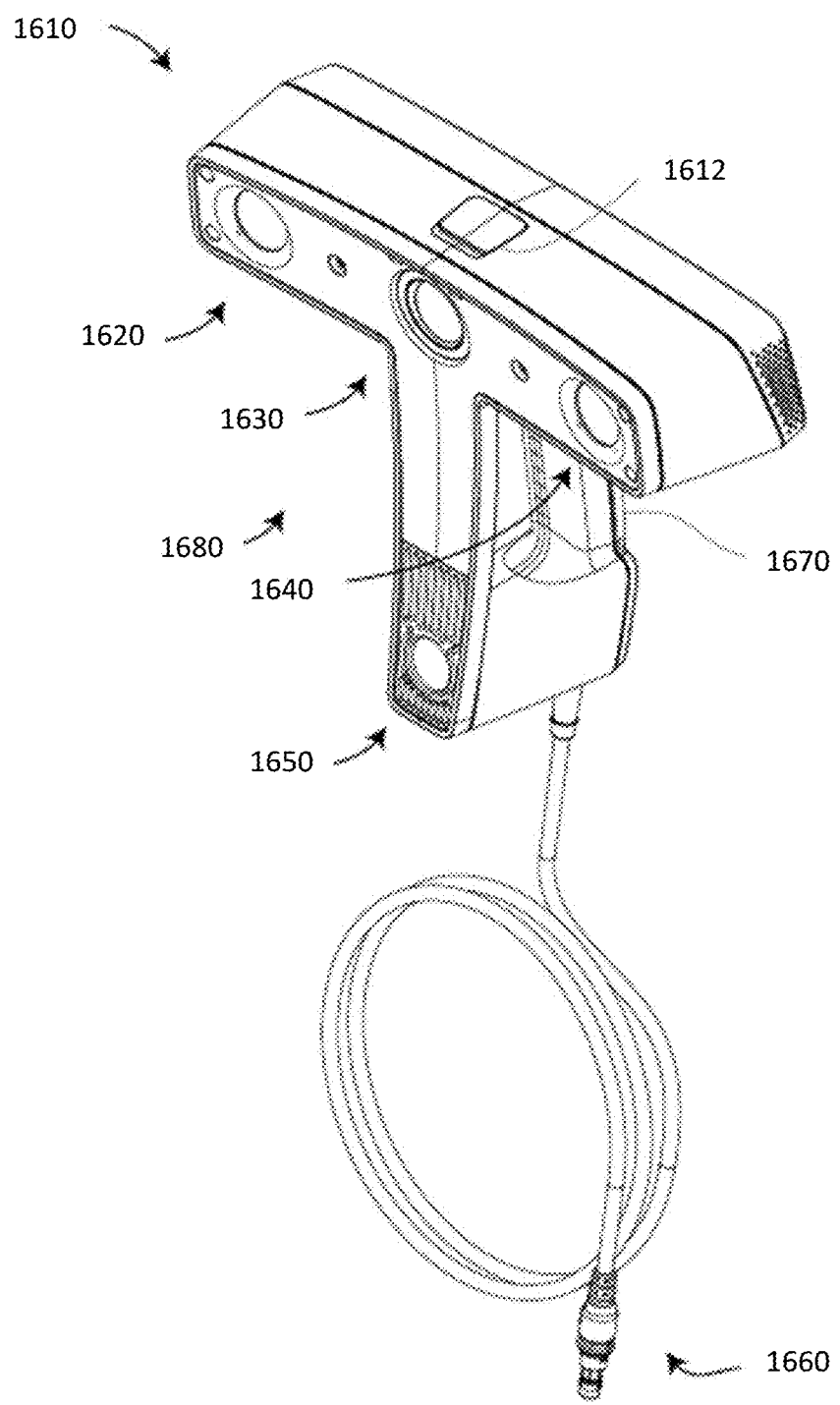
FIGS. 11, 12, 13A, and 13B depict a handheld 3D imager.
Figure 12:
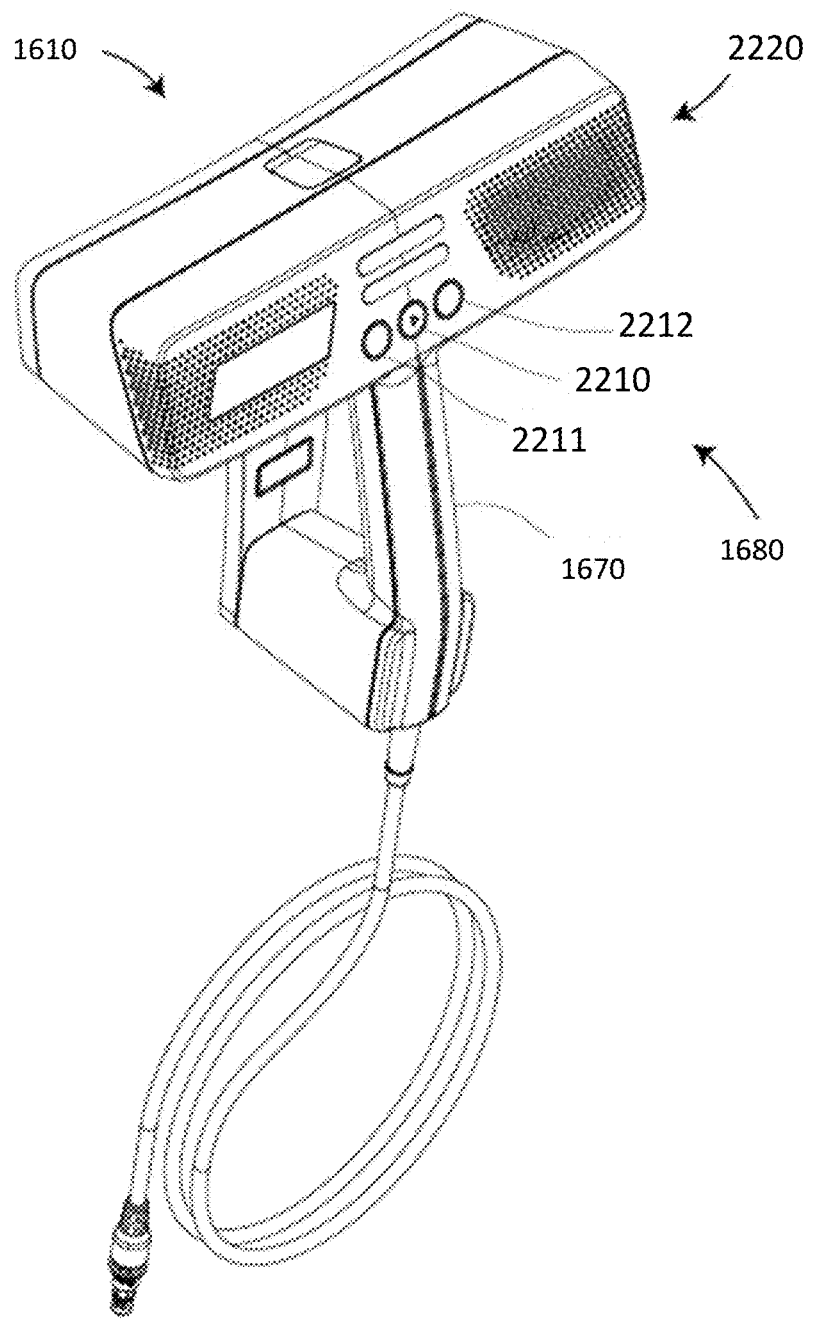

FIGS. 11, 12, 13A, and 13B depict a handheld 3D imager. FIG. 11 is a front isometric view of a handheld 3D triangulation scanner 1610, also referred to as a handheld 3D imager. In an aspect, the scanner 1610 includes a first infrared (IR) camera 1620, a second IR camera 1640, a registration camera 1630, a projector 1650, an Ethernet cable 1660 and a handle 1670. In an aspect, the registration camera 1630 is a color camera. Ethernet is a family of computer networking technologies standardized under IEEE 802.3. The enclosure 1680 includes the outmost enclosing elements of the scanner 1610, as explained in more detail herein below. FIG. 12 is a rear perspective view of the scanner 1610 further showing an exemplary perforated rear cover 2220 and a scan start/stop button 2210. In an aspect, buttons 2211, 2212 may be programmed to perform functions according to the instructions of a computer program, the computer program either stored internally within the scanner 1610 or externally in an external computer. In an aspect, each of the buttons 2210, 2211, 2212 includes at its periphery a ring illuminated by a light emitting diode (LED).

In an aspect, the scanner 1610 of FIG. 11 is the scanner described in commonly owned U.S. patent application Ser. No. 16/806,548 filed on Mar. 2, 2020, the contents of which are incorporated by reference herein in its entirety.

Figure 13A:
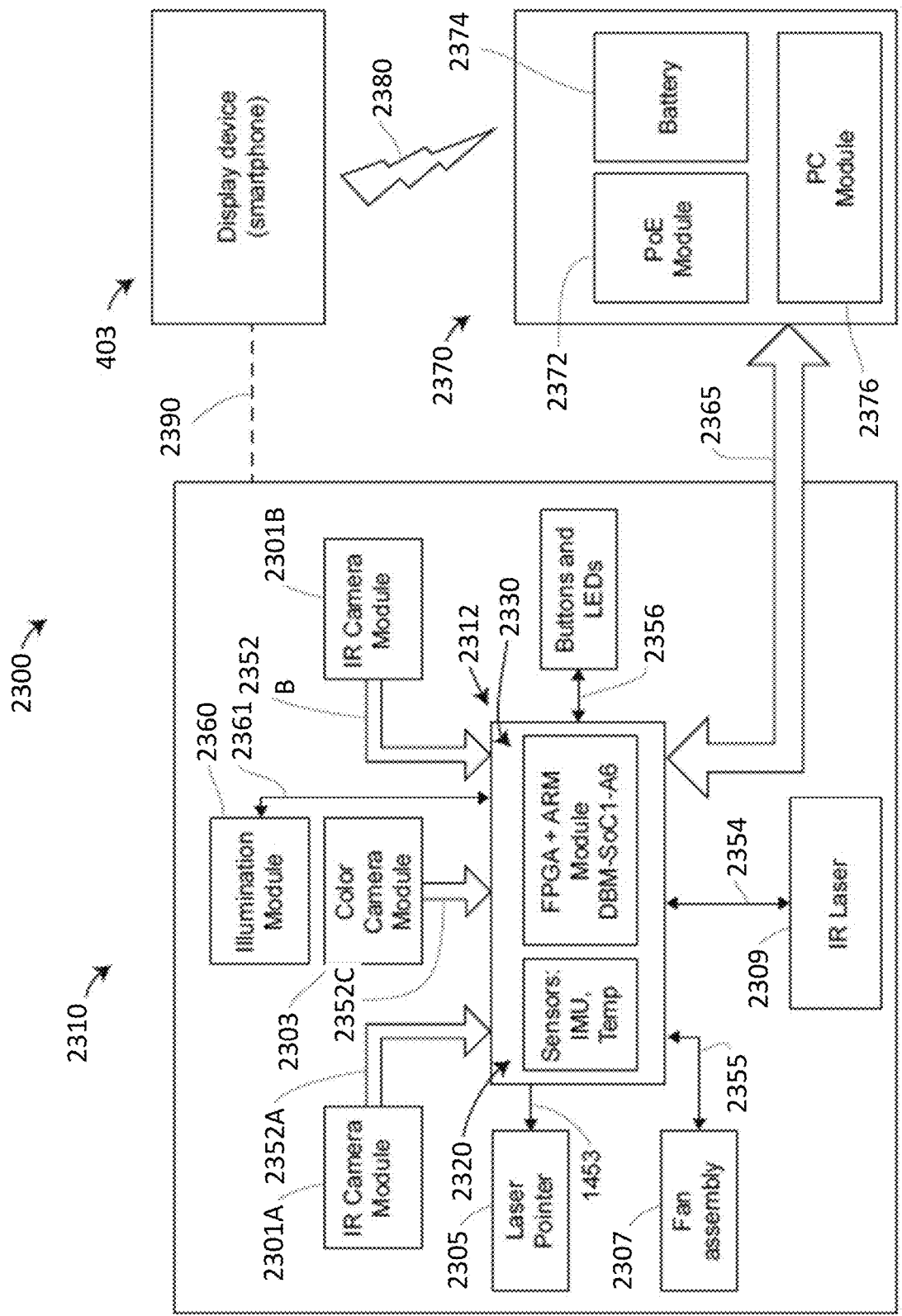
Figure 13B:
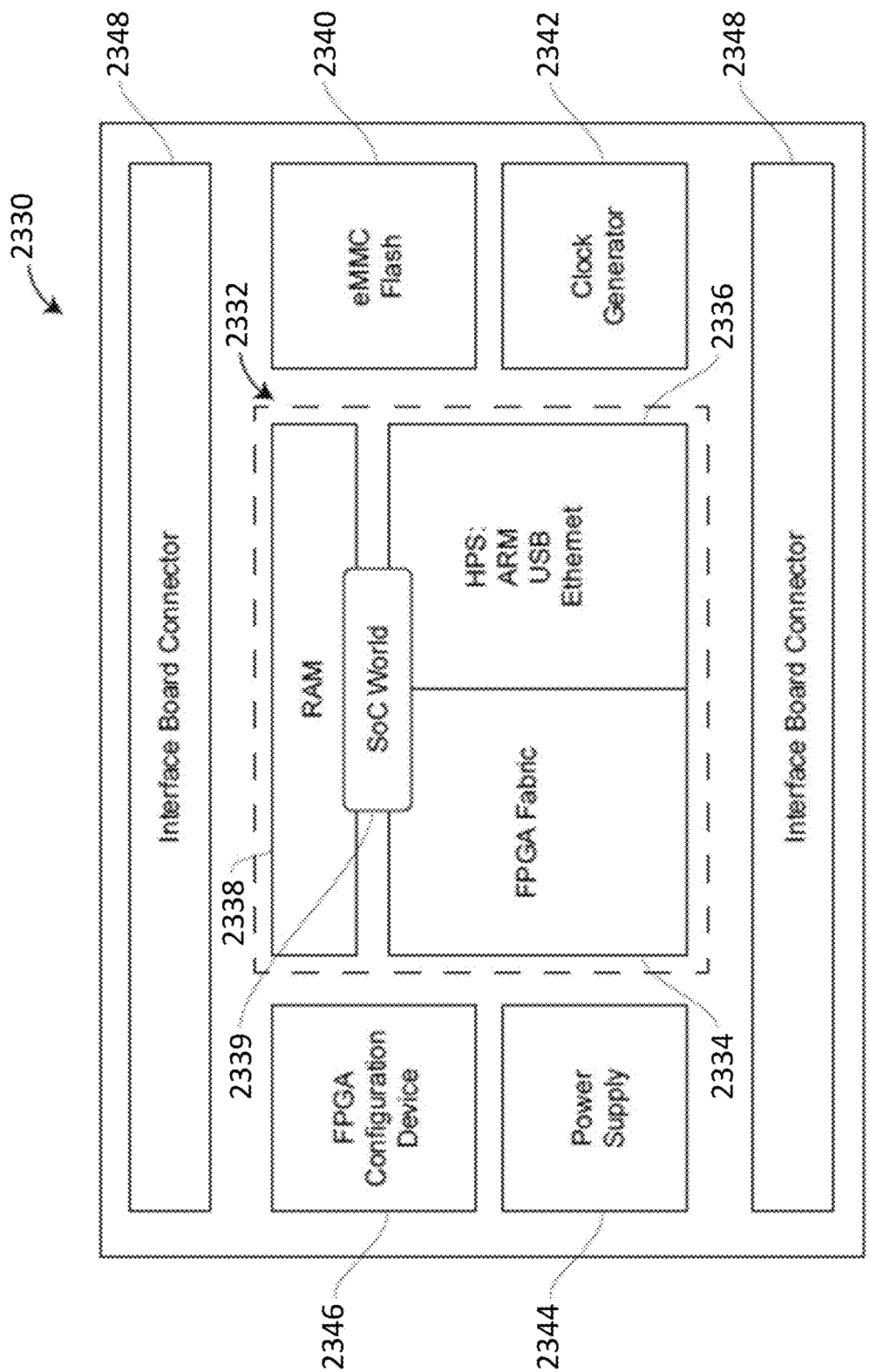

FIG. 13A is a block diagram of system electronics 2300 that in an aspect is included in the scanner system 10. In an aspect, the electronics 2300 includes electronics 2310 within the handheld scanner 1610, electronics 2370 within the computing device 110, electronics within the mobile computing device 403, electronics within other electronic devices such as accessories that attach to an accessory interface (not shown), and electronics such as external computers that cooperate with the scanner system electronics 2300. In an aspect, the electronics 2310 includes a circuit baseboard 2312 that includes a sensor collection 2320 and a computing module 2330, which is further shown in FIG. 13B. In an aspect, the sensor collection 2320 includes an IMU and one or more temperature sensors. In an aspect, the computing module 2330 includes a system-on-a-chip (SoC) field programmable gate array (FPGA) 2332. In an aspect, the SoC FPGA 2332 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, Calif. FIG. 18B represents the SoC FPGA 2332 in block diagram form as including FPGA fabric 2334, a Hard Processor System (HPS) 2336, and random access memory (RAM) 2338 tied together in the SoC 2339. In an aspect, the HPS 2336 provides peripheral functions such as Gigabit Ethernet and USB. In an aspect, the computing module 2330 further includes an embedded MultiMedia Card (eMMC) 2340 having flash memory, a clock generator 2342, a power supply 2344, an FPGA configuration device 2346, and interface board connectors 2348 for electrical communication with the rest of the system.

Signals from the infrared (IR) cameras 2301A, 2301B and the registration camera 2303 are fed from camera boards through cables to the circuit baseboard 2312. Image signals 2352A, 2352B, 2352C from the cables are processed by the computing module 2330. In an aspect, the computing module 2330 provides a signal 2353 that initiates emission of light from the laser pointer 2305. A TE control circuit communicates with the TE cooler within the infrared laser 2309 through a bidirectional signal line 2354. In an aspect, the TE control circuit is included within the SoC FPGA 2332. In another aspect, the TE control circuit is a separate circuit on the baseboard 2312. A control line 2355 sends a signal to the fan assembly 2307 to set the speed of the fans. In an aspect, the controlled speed is based at least in part on the temperature as measured by temperature sensors within the sensor unit 2320. In an aspect, the baseboard 2312 receives and sends signals to buttons 2210, 2211, 2212 and their LEDs through the signal line 2356. In an aspect, the baseboard 2312 sends over a line 2361 a signal to an illumination module 2360 that causes white light from the LEDs to be turned on or off.

In an aspect, bidirectional communication between the electronics 2310 and the electronics 2370 is enabled by Ethernet communications link 2365. In an aspect, the Ethernet link is provided by the cable 1660. In an aspect, the cable 1660 attaches to the mobile PC 401 through the connector on the bottom of the handle. The Ethernet communications link 2365 is further operable to provide or transfer power to the electronics 2310 through the user of a custom Power over Ethernet (PoE) module 2372 coupled to the battery 2374. In an aspect, the mobile PC 2370 further includes a PC module 2376, which in an aspect is an Intel® Next Unit of Computing (NUC) processor. The NUC is manufactured by Intel Corporation, with headquarters in Santa Clara, Calif. In an aspect, the mobile PC 2370 is configured to be portable, such as by attaching to a belt and carried around the waist or shoulder of an operator.

It should be appreciated that the examples of measurement devices depicted herein can further be attached an external camera to capture the identity images 310, in addition to any of the cameras that are already associated with the measurement devices.

Terms such as processor, controller, computer, DSP, FPGA are understood in this document to mean a computing device that may be located within an instrument, distributed in multiple elements throughout an instrument, or placed external to an instrument.

In one or more aspects, the captured data 125 can be used to generate a map 130 of the environment in which the measurement device 120 is being moved. The computing device 110 and/or the computing device 150 can generate map 130. Map 130 can be generated by combining several instances of the captured data 125, for example, submaps. Each submap can be generated using SLAM, which includes generating one or more submaps corresponding to one or more portions of the environment. The submaps are generated using the one or more sets of measurements from the sets of sensors 122. The submaps are further combined by the SLAM algorithm to generate map 130.

It should be noted that a "submap" is a representation of a portion of the environment and that map 130 of the environment includes several such submaps "stitched" together. Stitching the maps together includes determining one or more landmarks on each submap that is captured and aligning and registering the submaps with each other to generate map 130. In turn, generating each submap includes combining or stitching one or more sets of captured data 125 from the measurement device 120. Combining two or more captured data 125 requires matching, or registering one or more landmarks in the captured data 125 being combined.

Here, a "landmark" is a feature that can be detected in the captured data 125, and which can be used to register a point from a first captured data 125 with a point from a second captured data 125 being combined. For example, the landmark can facilitate registering a 3D point cloud with another 3D point cloud or to register an image with another image. Here, the registration can be done by detecting the same landmark in the two captured data 125 (images, point clouds, etc.) that are to be registered with each other. A landmark can include but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the measurement device 120. Such artificial landmarks can include identification marks that can be reliably captured and used by the measurement device 120. Examples of artificial landmarks can include predetermined markers, such as labels of known dimensions and patterns, e.g., a checkerboard pattern, a target sign, spheres, or other such preconfigured markers.

In the case of some of the measurement devices 120, such as a volume scanner, the computing device 110, 150 can implement SLAM while building the scan to prevent the measurement device 120 from losing track of where it is by virtue of its motion uncertainty because there is no presence of an existing map of the environment (the map is being generated simultaneously). It should be noted that in the case of some types of measurement devices 120, SLAM is not performed. For example, in the case of a laser tracker 20, the captured data 125 from the measurement device 120 is stored without performing SLAM.

It should be noted that although description of implementing SLAM is provided, other uses of the captured data (2D images and 3D scans) are possible in other aspects of the technical solutions herein.

Figure 14:
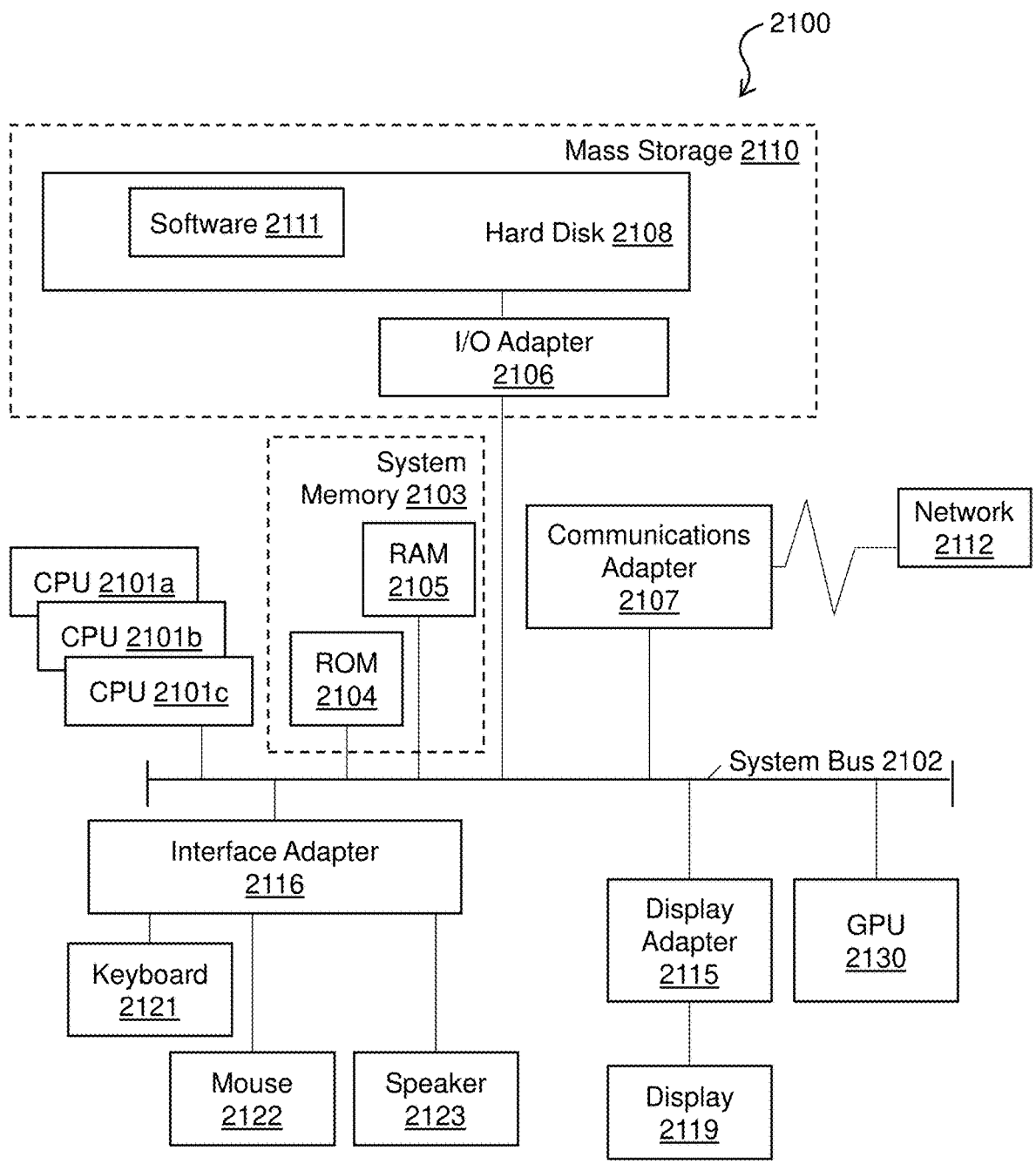
FIG. 14 depicts a computer system according to one or more aspects.

Turning now to FIG. 14, a computer system 2100 is generally shown in accordance with an aspect. The computer system 2100 can be used as the computing device 110 and/or the computing device 150. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system 2100 has one or more central processing units (CPU(s)) 2101a, 2101b, 2101c, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read only memory, flash memory, or any other suitable memory systems.

The computer system 2100 comprises a graphics processing unit (GPU) 2130 that can include one or more processing cores and memory devices. The GPU can be used as a co-processor by the processors 2101 to perform one or more operations described herein.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as a mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described herein below with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one aspect, a portion of the system memory 2103 and the mass storage 2110 collectively store an operating system, which may be any appropriate operating system to coordinate the functions of the various components shown in FIG. 14.

Additional input/output devices are shown as connected to the system bus 2102 via a display adapter 2115 and an interface adapter 2116 and. In one aspect, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics intensive applications and a video controller. A keyboard 2121, a mouse 2122, a speaker 2123, etc. can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 14, the computer system 2100 includes processing capability in the form of the processors 2101, and, storage capability including the system memory 2103 and the mass storage 2110, input means such as the keyboard 2121 and the mouse 2122, and output capability including the speaker 2123 and the display 2119.

In some aspects, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through the network 2112. In some examples, an external computing device may be an external webserver or a cloud computing node.

It is to be understood that the block diagram of FIG. 14 is not intended to indicate that the computer system 2100 is to include all of the components shown in FIG. 14. Rather, the computer system 2100 can include any appropriate fewer or additional components not illustrated in FIG. 14 (e.g., additional memory components, embedded controllers, modules, additional network interfaces, etc.). Further, the aspects described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various aspects.

It will be appreciated that aspects of the present disclosure may be embodied as a system, method, or computer program product and may take the form of a hardware aspect, a software aspect (including firmware, resident software, micro-code, etc.), or a combination thereof. Furthermore, aspects of the present disclosure may take the form of a computer program product embodied in one or more computer-readable medium(s) having computer-readable program code embodied thereon. Methods herein can be computer-implemented methods.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to aspects. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various aspects of the invention have been described, it is to be understood that aspects of the invention may include only some of the described aspects. Accordingly, the invention is not to be seen as limited by the foregoing description but is only limited by the scope of the appended claims.

What is claimed is:

1. A system comprising:
   a first type of measurement device that captures one or more first 2D images of a surrounding environment;
   a second type of measurement device that captures one or more 3D scans of the surrounding environment, a 3D scan comprising a point cloud and a second 2D image;
   one or more processors configured to perform a method to register the one or more first 2D images, wherein method comprises:
      accessing the 3D scan from the second type of measurement device, the 3D scan records at least a portion of the surrounding environment that is also captured by a first 2D image from the first type of measurement device;
      detecting 2D features in the second 2D image from the 3D scan, and associating 3D coordinates from the point cloud to the 2D features in the second 2D image;
      detecting 2D features in the first 2D image from the first type of measurement device;
      identifying matching 2D features from the first 2D image and the second 2D image from the 3D scan;
      based on determining at least a predetermined number of matching 2D features from the first 2D image and the second 2D image, calculating a position and orientation of the first 2D image in a coordinate system of the 3D scan using the matching 2D features.

2. The system of claim 1, wherein the second type of measurement device is a 3D scanner and wherein the second 2D image is either captured by a camera associated with the 3D scanner, or is generated using the point cloud.

3. The system of claim 1, wherein the first type of measurement device is a camera.

4. The system of claim 3, wherein the 2D image from the first type of measurement device captures at least a portion of the surrounding environment that cannot be accessed by the second type of measurement device.

5. The system of claim 1, wherein the first type of measurement device is a portable device that includes a camera.

6. The system of claim 5, wherein the first type of measurement device is a drone.

7. The system of claim 1, wherein the second 2D image in the 3D scan is a panoramic image.

8. The system of claim 1, wherein the second 2D image in the 3D scan is a color image.

9. The system of claim 1, wherein the 2D features comprise one or more natural features that are detected in said portion.

10. The system of claim 1, wherein the one or more first 2D images and the 3D scan are captured concurrently.

11. The system of claim 1, wherein the one or more first 2D images and the 3D scan are captured at different times.

12. A computer-implemented method performed by one or more processors to automatically register one or more first 2D images of a surrounding environment, wherein the computer-implemented method comprises:
   accessing a 3D scan that records at least a portion of the surrounding environment, the portion is also captured by a first 2D image from the one or more first 2D images, and the 3D scan comprises a point cloud and a second 2D image;
   detecting 2D features in the second 2D image from the 3D scan, and associating 3D coordinates from the point cloud to the 2D features in the second 2D image;
   detecting 2D features in the first 2D image from the first type of measurement device;
   identifying matching 2D features from the first 2D image and the second 2D image from the 3D scan;
   based on determining at least a predetermined number of matching 2D features from the first 2D image and the second 2D image, calculating a position and orientation of the first 2D image in a coordinate system of the 3D scan using the matching 2D features.

13. The computer-implemented method of claim 12, wherein the 3D scan is captured by a 3D scanner.

14. The computer-implemented method of claim 13, wherein the 2D image is captured by a portable camera, and the 2D image captures at least a portion of the surrounding environment that cannot be accessed by the 3D scanner.

15. The computer-implemented method of claim 14, wherein the 2D image is captured by the portable camera concurrently with the 3D scan being captured by the 3D scanner.

16. The computer-implemented method of claim 14, wherein the corresponding image in the 3D scan is either a color image or an intensity image.

17. A system comprising:
 a first type of measurement device that captures first 2D images of a surrounding environment;
 a second type of measurement device that captures at least a first 3D scan and a second 3D scan of the surrounding environment, the first 3D scan captured from a first position and the second 3D scan captured from a second position; and
 one or more processors configured to perform a computer-implemented method to register the first 3D scan and the second 3D scan, each 3D scan comprises a point cloud and a second 2D image, wherein the computer-implemented method comprises:
  accessing one or more first 2D images from the first type of measurement device, the one or more first 2D images record portions of the surrounding environment overlapping with the first 3D scan and the second 3D scan;
  generating one or more first localized images by calculating a first pose of the one or more first 2D images with respect to the first 3D scan;
  generating one or more second localized images by calculating a second pose of the one or more first 2D images with respect to the second 3D scan; and
  computing a transformation between the first 3D scan and the second 3D scan based on the first pose and the second pose.

18. The system of claim 17, wherein the second 2D image is either captured by a camera or is generated using the point cloud.

19. The system of claim 17, wherein generating the one or more first localized images comprises:
 detecting 2D features in the second 2D image from the first 3D scan, and associating 3D coordinates from the point cloud to the 2D features in the second 2D image;
 detecting 2D features in the one or more first 2D images;
 identifying matching 2D features from the one or more first 2D images and the second 2D image from the first 3D scan;
 based on determining at least a predetermined number of matching 2D features from the one or more first 2D images and the second 2D image from the first 3D scan, calculating the first pose of the one or more first 2D images in a coordinate system of the first 3D scan using the matching 2D features; and
 generating the one or more first localized images by transforming the one or more first 2D images using the first pose.

20. The system of claim 17, wherein the first type of measurement device is a camera, and the second type of measurement device is a 3D scanner.

* * * * *